US010306558B2

United States Patent
Kaechi

(10) Patent No.: US 10,306,558 B2
(45) Date of Patent: May 28, 2019

(54) POWER RECEIVING APPARATUS FOR WIRELESSLY RECEIVING POWER FROM EXTERNAL APPARATUS

(71) Applicant: CANON KABUSHIKI KAISHA, Tokyo (JP)

(72) Inventor: Shuya Kaechi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 15/297,992

(22) Filed: Oct. 19, 2016

(65) Prior Publication Data

US 2017/0118714 A1    Apr. 27, 2017

(30) Foreign Application Priority Data

Oct. 22, 2015 (JP) .................................. 2015-208425

(51) Int. Cl.
| | |
|---|---|
| H04W 52/02 | (2009.01) |
| H04W 4/00 | (2018.01) |
| H04W 52/04 | (2009.01) |
| H04W 72/04 | (2009.01) |
| H04B 5/00 | (2006.01) |
| H04W 4/80 | (2018.01) |

(52) U.S. Cl.
CPC ...... *H04W 52/0235* (2013.01); *H04B 5/0031* (2013.01); *H04B 5/0037* (2013.01); *H04B 5/0087* (2013.01); *H04W 4/80* (2018.02)

(58) Field of Classification Search
CPC .. H02J 7/025; H02J 5/005; H02J 50/00; H02J 50/10; H02J 50/12; H02J 50/40; H02J 50/80; H04B 5/0037; H04B 5/0031; H04B 5/0025
See application file for complete search history.

(56) References Cited

U.S. PATENT DOCUMENTS

| | | | | |
|---|---|---|---|---|
| 8,971,799 | B2 * | 3/2015 | Hamada ................. | H02J 7/025 455/41.1 |
| 9,004,360 | B2 * | 4/2015 | Kargl .................... | G06K 7/0008 235/451 |
| 9,219,385 | B2 * | 12/2015 | Kim ....................... | H02J 7/025 |
| 9,287,716 | B2 * | 3/2016 | Toshimitsu ............. | H02J 5/005 |
| 9,466,989 | B2 * | 10/2016 | Culbert ................... | G06F 1/26 |
| 9,607,757 | B2 * | 3/2017 | Hirobe .................... | H01Q 5/40 |
| 9,780,837 | B2 * | 10/2017 | Dobyns ................ | H04B 5/0031 |
| 9,912,380 | B2 * | 3/2018 | Suzuki ................ | H04B 5/0037 |

(Continued)

FOREIGN PATENT DOCUMENTS

| | | |
|---|---|---|
| JP | 2012-65455 A | 3/2012 |
| JP | 2014-33504 A | 2/2014 |

*Primary Examiner* — Hoang-Chuong Q Vu
(74) *Attorney, Agent, or Firm* — Canon U.S.A., Inc. IP Division

(57) ABSTRACT

A power receiving apparatus includes a first antenna, a second antenna, and a control unit that executes control to exclusively and alternately execute power reception processing of wirelessly obtaining power from a power transmission apparatus via the first antenna and communication processing of wirelessly communicating with the power transmission apparatus via the second antenna, where, during execution of the communication processing, the control unit executes control to set a resonance frequency of the first antenna to be a frequency lower than a carrier frequency band of the second antenna for the execution of the communication processing.

10 Claims, 24 Drawing Sheets

(56) References Cited

U.S. PATENT DOCUMENTS

| | | | | |
|---|---|---|---|---|
| 2006/0145660 A1* | 7/2006 | Black | ............... | H02J 7/025 |
| | | | | 320/108 |
| 2009/0111531 A1* | 4/2009 | Cui | ............... | H01Q 1/243 |
| | | | | 455/572 |
| 2010/0210207 A1* | 8/2010 | Goto | ............... | G06K 7/0008 |
| | | | | 455/41.1 |
| 2012/0313445 A1* | 12/2012 | Park | ............... | H02J 5/005 |
| | | | | 307/104 |
| 2013/0057079 A1* | 3/2013 | Park | ............... | H02J 7/00 |
| | | | | 307/104 |
| 2013/0127683 A1* | 5/2013 | Hoang | ............... | H01Q 1/50 |
| | | | | 343/858 |
| 2016/0005068 A1* | 1/2016 | Im | ............... | G06Q 30/0237 |
| | | | | 705/14.14 |
| 2016/0372976 A1* | 12/2016 | Shimura | ............... | H02J 7/025 |
| 2017/0018953 A1* | 1/2017 | Yamaguchi | ............... | H02J 50/90 |

* cited by examiner

FIG. 4

| STATE | NAME OF STATE | RX POWER RECEIVING ANTENNA 204 | RX COMMUNICATION ANTENNA 218 | OPERATION |
|---|---|---|---|---|
| CLOSE PROXIMITY WIRELESS COMMUNICATION/BACKUP POWER TRANSMISSION | COMM | f3 (20MHz) | f0 (13.56MHz) | CLOSE PROXIMITY WIRELESS COMMUNICATION ENABLED |
| POWER TRANSMISSION/ RECEPTION | WPT | f0 (13.56MHz) | f1 (4MHz) | CLOSE PROXIMITY WIRELESS COMMUNICATION DISABLED |
| TEMPORARY STOP | SUSP | f3 (20MHz) | f1 (4MHz) | OTHER DEVICE DETECTION |
| TRANSITION/WAIT | BLNK | — | — | FREQUENCY SWITCHING/ SEQUENCE START·END |

FIG. 6

| APPARATUS NAME | POWER RECEIVING APPARATUS 200 | TRANSMISSION ← RECEPTION |
|---|---|---|
| POWER FEEDING METHOD | POWER FREQUENCY f0, IN-BAND COMMUNICATION | TRANSMISSION → RECEPTION |
| COPING WITH OTHER DEVICE DETECTION | ENABLED | TRANSMISSION ← RECEPTION |
| POWER RECEPTION ENABLED/DISABLED | ENABLED | TRANSMISSION ← RECEPTION |
| BATTERY VOLTAGE | 3.4V | TRANSMISSION ← RECEPTION |
| BATTERY FULL CHARGE VOLTAGE | 4.2V | TRANSMISSION ← RECEPTION |
| BATTERY REMAINING CAPACITY LEVEL | 40% | TRANSMISSION ← RECEPTION |
| MAXIMUM RECEIVED POWER | 3.0W | TRANSMISSION ← RECEPTION |
| POWER TRANSMISSION/RECEPTION REQUESTING POWER | 2.8W | TRANSMISSION ← RECEPTION |
| BLANK TIME | 0.5s | TRANSMISSION → RECEPTION |
| POWER FEEDING SEQUENCE WAITING TIME | 1s | TRANSMISSION → RECEPTION |
| TIME FOR POWER FEEDING AND COMMUNICATION | POWER FEEDING 6s: POWER FEEDING COMMUNICATION 1s | TRANSMISSION → RECEPTION |

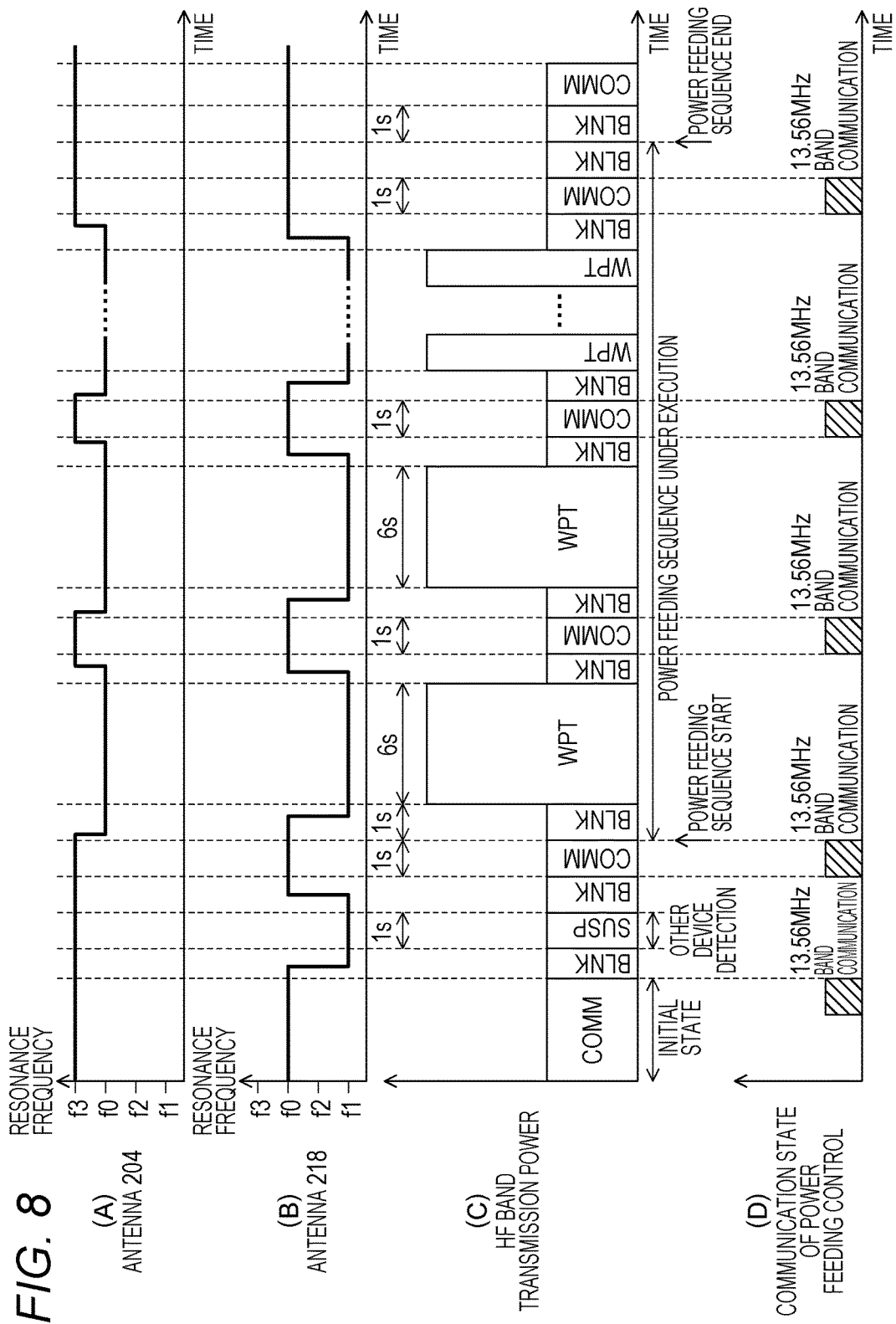

FIG. 10

| STATE | NAME OF STATE | RX POWER RECEIVING ANTENNA 204A | RX COMMUNICATION ANTENNA 218A | OPERATION |
|---|---|---|---|---|
| CLOSE PROXIMITY WIRELESS COMMUNICATION/BACKUP POWER TRANSMISSION | COMM | f2 (6.78MHz) | f0 (13.56MHz) | CLOSE PROXIMITY WIRELESS COMMUNICATION ENABLED |
| POWER TRANSMISSION/ RECEPTION | WPT | f2 (6.78MHz) | f1 (4MHz) | CLOSE PROXIMITY WIRELESS COMMUNICATION DISABLED |
| TEMPORARY STOP | SUSP | f1 (4MHz) | f1 (4MHz) | OTHER DEVICE DETECTION |
| TRANSITION/WAIT | BLNK | — | — | FREQUENCY SWITCHING/ SEQUENCE START·END |

FIG. 12

| APPARATUS NAME | POWER RECEIVING APPARATUS 200A | |
|---|---|---|
| POWER FEEDING METHOD | POWER FREQUENCY f2, OUT-OF-BAND COMMUNICATION | TRANSMISSION ↔ RECEPTION |
| COPING WITH OTHER DEVICE DETECTION | ENABLED | TRANSMISSION → RECEPTION |
| POWER RECEPTION ENABLED/DISABLED | ENABLED | TRANSMISSION ↔ RECEPTION |
| BATTERY VOLTAGE | 3.4V | TRANSMISSION ↔ RECEPTION |
| BATTERY FULL CHARGE VOLTAGE | 4.2V | TRANSMISSION ↔ RECEPTION |
| BATTERY REMAINING CAPACITY LEVEL | 40% | TRANSMISSION ↔ RECEPTION |
| MAXIMUM RECEIVED POWER | 3.0W | TRANSMISSION ↔ RECEPTION |
| POWER TRANSMISSION/RECEPTION REQUESTING POWER | 2.8W | TRANSMISSION ↔ RECEPTION |
| BLANK TIME | 0.5s | TRANSMISSION ↔ RECEPTION |
| POWER FEEDING SEQUENCE WAITING TIME | 1s | TRANSMISSION → RECEPTION |

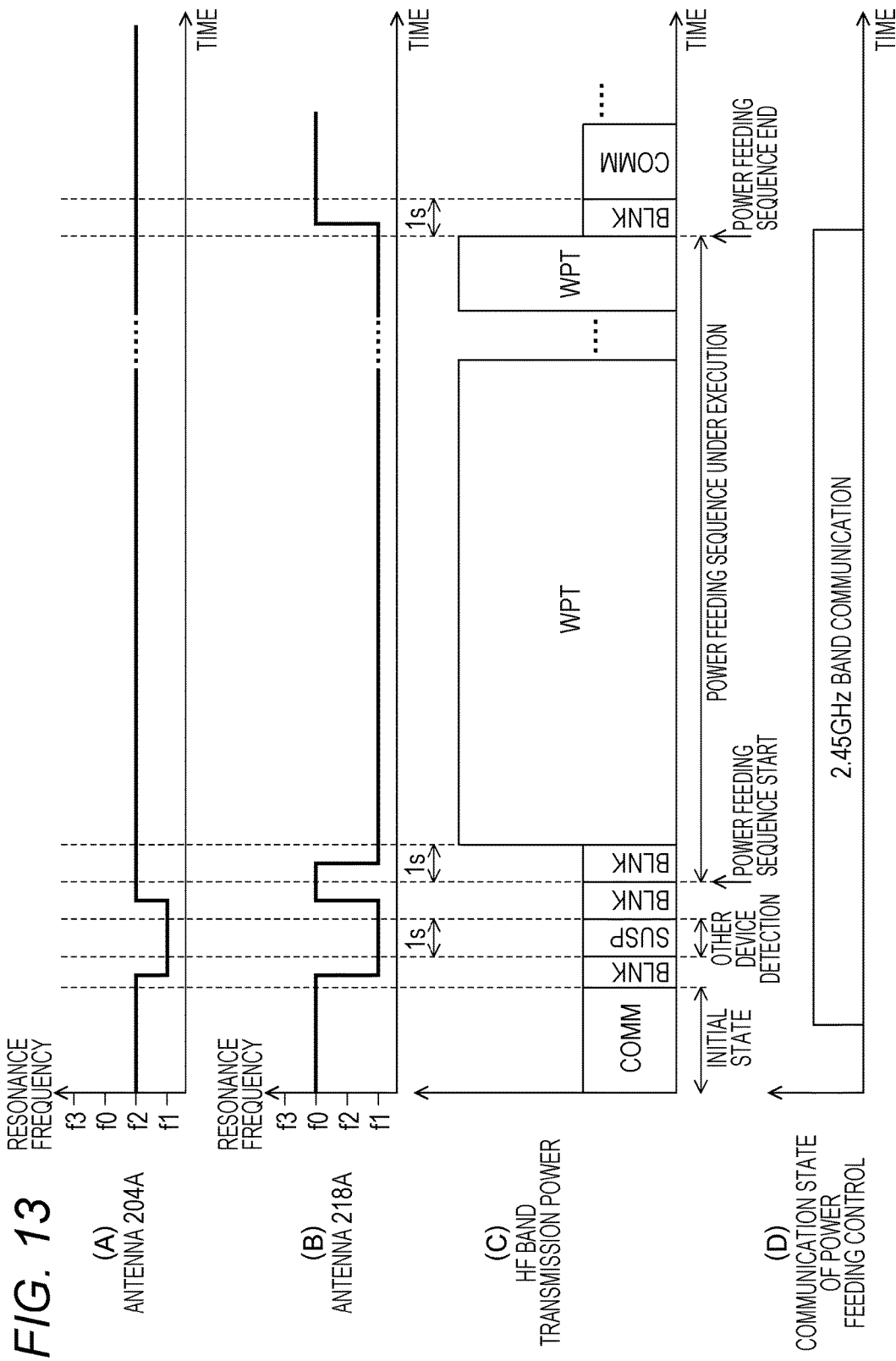

FIG. 15

| STATE | NAME OF STATE | RX POWER RECEIVING ANTENNA 204B | RX COMMUNICATION ANTENNA 218B | OPERATION |
|---|---|---|---|---|
| CLOSE PROXIMITY WIRELESS COMMUNICATION/BACKUP POWER TRANSMISSION | COMM | f3 (20MHz) | f0 (13.56MHz) | CLOSE PROXIMITY WIRELESS COMMUNICATION ENABLED |
| POWER TRANSMISSION/ RECEPTION | WPT | f0 (13.56MHz) | f1 (4MHz) | CLOSE PROXIMITY WIRELESS COMMUNICATION DISABLED |
| TEMPORARY STOP | SUSP | f3 (20MHz) | f1 (4MHz) | OTHER DEVICE DETECTION |
| TRANSITION/WAIT | BLNK | — | — | FREQUENCY SWITCHING/ SEQUENCE START·END |

FIG. 16

| STATE | NAME OF STATE | RX POWER RECEIVING ANTENNA 204B | RX COMMUNICATION ANTENNA 218B | OPERATION |
|---|---|---|---|---|
| CLOSE PROXIMITY WIRELESS COMMUNICATION/BACKUP POWER TRANSMISSION | COMM | f3 (20MHz) | f0 (13.56MHz) | CLOSE PROXIMITY WIRELESS COMMUNICATION ENABLED |
| POWER TRANSMISSION/ RECEPTION | WPT | f2 (6.78MHz) | f1 (4MHz) | CLOSE PROXIMITY WIRELESS COMMUNICATION DISABLED |
| TEMPORARY STOP | SUSP | f3 (20MHz) | f1 (4MHz) | OTHER DEVICE DETECTION |
| TRANSITION/WAIT | BLNK | — | — | FREQUENCY SWITCHING/ SEQUENCE START-END |

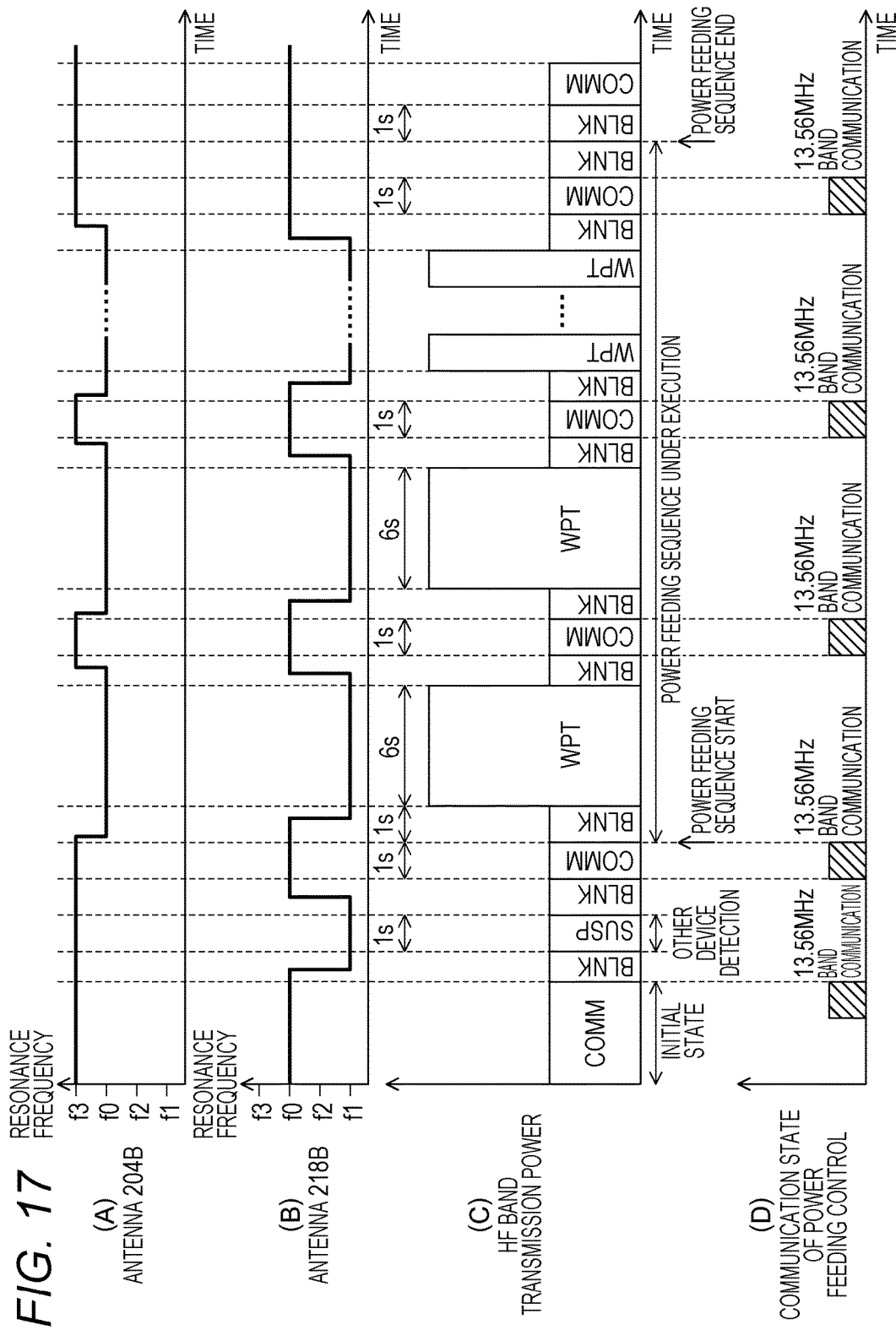

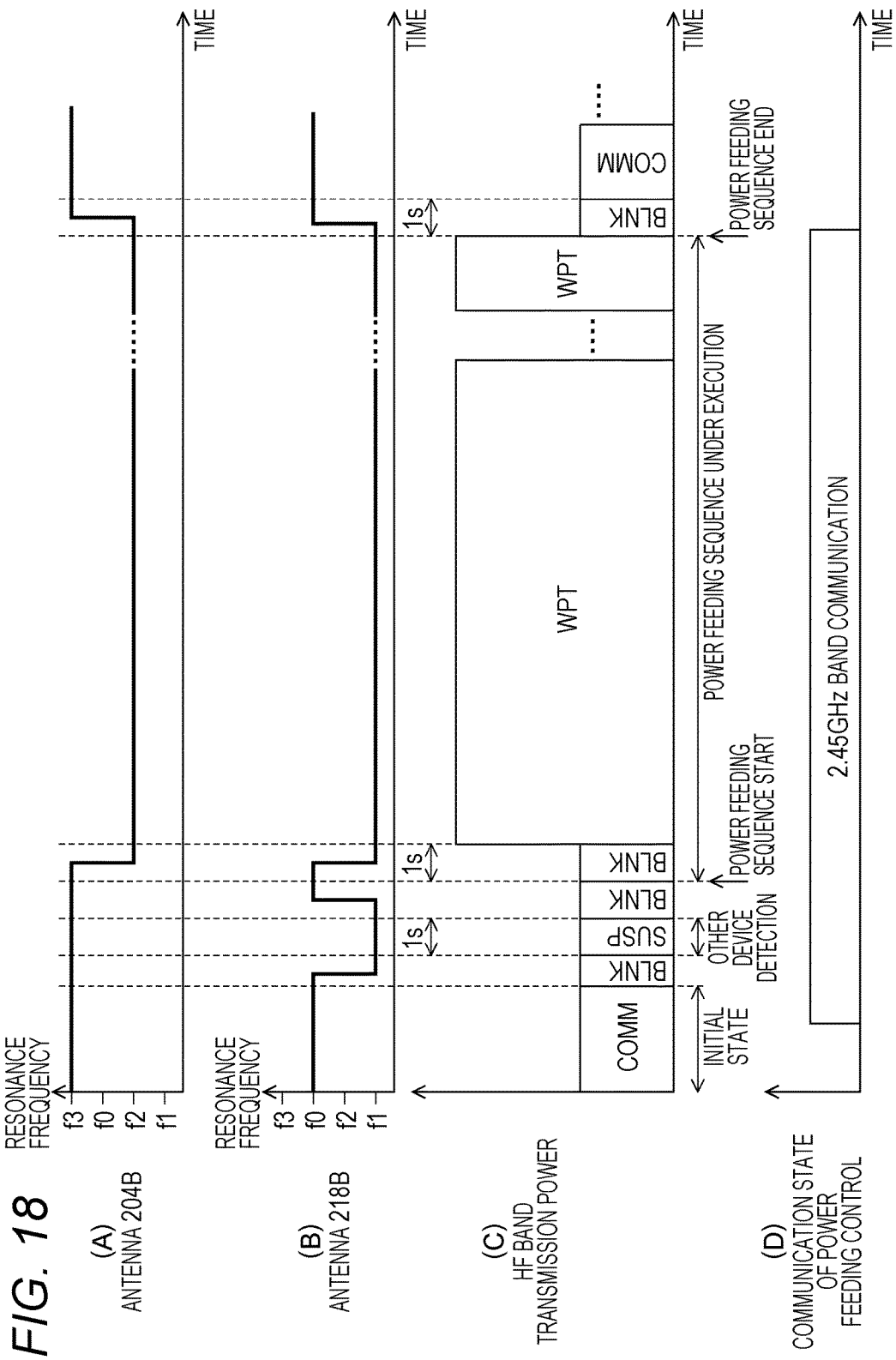

FIG. 19

| STATE | NAME OF STATE | RX POWER RECEIVING ANTENNA 204B | RX COMMUNICATION ANTENNA 218B | OPERATION |
|---|---|---|---|---|
| CLOSE PROXIMITY WIRELESS COMMUNICATION/BACKUP POWER TRANSMISSION | COMM | f2 (6.78MHz) | f0 (13.56MHz) | CLOSE PROXIMITY WIRELESS COMMUNICATION ENABLED |
| POWER TRANSMISSION/RECEPTION | WPT | f0 (13.56MHz) | f1 (4MHz) | CLOSE PROXIMITY WIRELESS COMMUNICATION DISABLED |
| TEMPORARY STOP | SUSP | f2 (6.78MHz) | f1 (4MHz) | OTHER DEVICE DETECTION |
| TRANSITION/WAIT | BLNK | — | — | FREQUENCY SWITCHING/SEQUENCE START-END |

FIG. 20

| STATE | NAME OF STATE | RX POWER RECEIVING ANTENNA 204B | RX COMMUNICATION ANTENNA 218B | OPERATION |
|---|---|---|---|---|
| CLOSE PROXIMITY WIRELESS COMMUNICATION/BACKUP POWER TRANSMISSION | COMM | f2 (6.78MHz) | f0 (13.56MHz) | CLOSE PROXIMITY WIRELESS COMMUNICATION ENABLED |
| POWER TRANSMISSION/ RECEPTION | WPT | f2 (6.78MHz) | f1 (4MHz) | CLOSE PROXIMITY WIRELESS COMMUNICATION DISABLED |
| TEMPORARY STOP | SUSP | f1 (4MHz) | f1 (4MHz) | OTHER DEVICE DETECTION |
| TRANSITION/WAIT | BLNK | — | — | FREQUENCY SWITCHING/ SEQUENCE START·END |

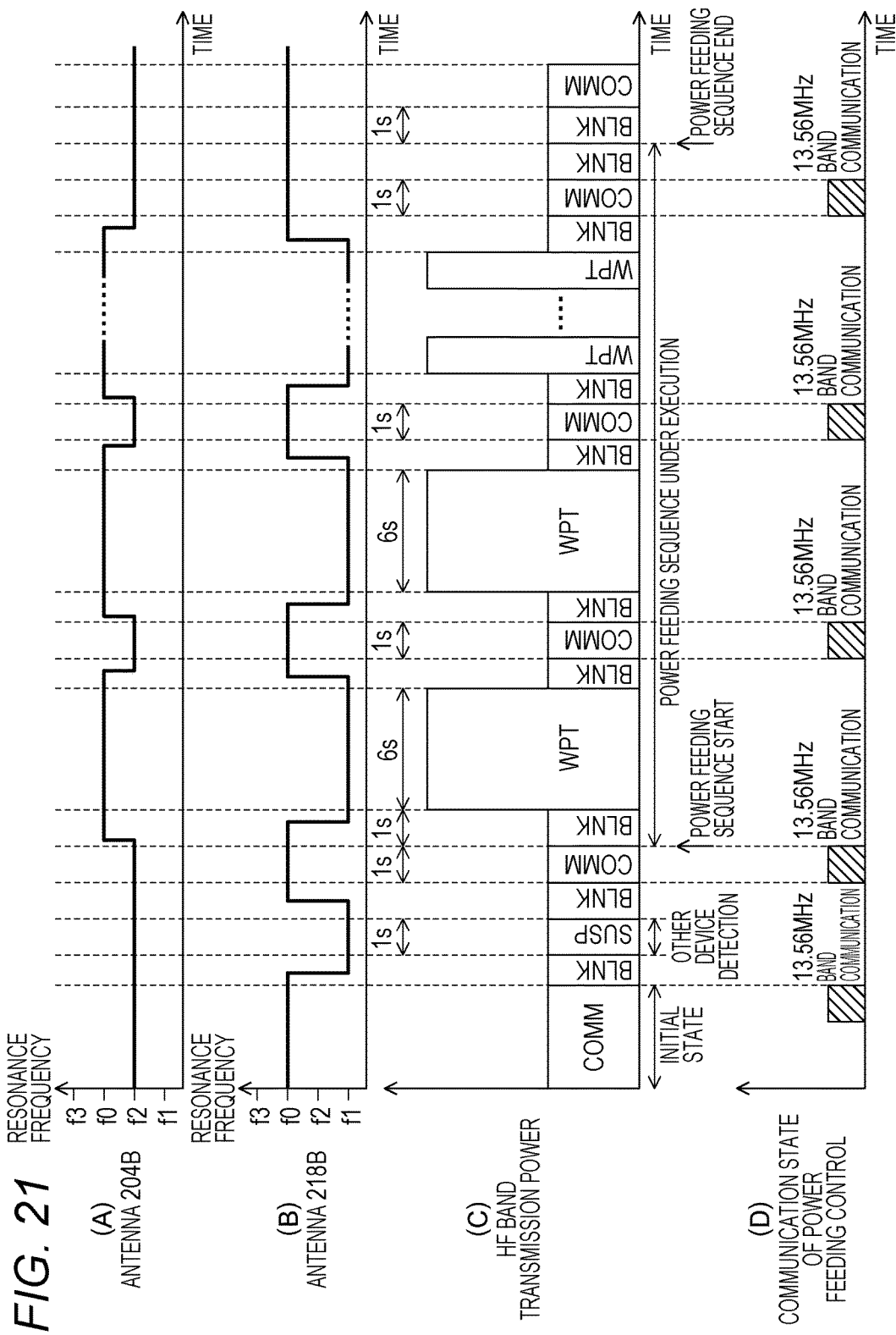

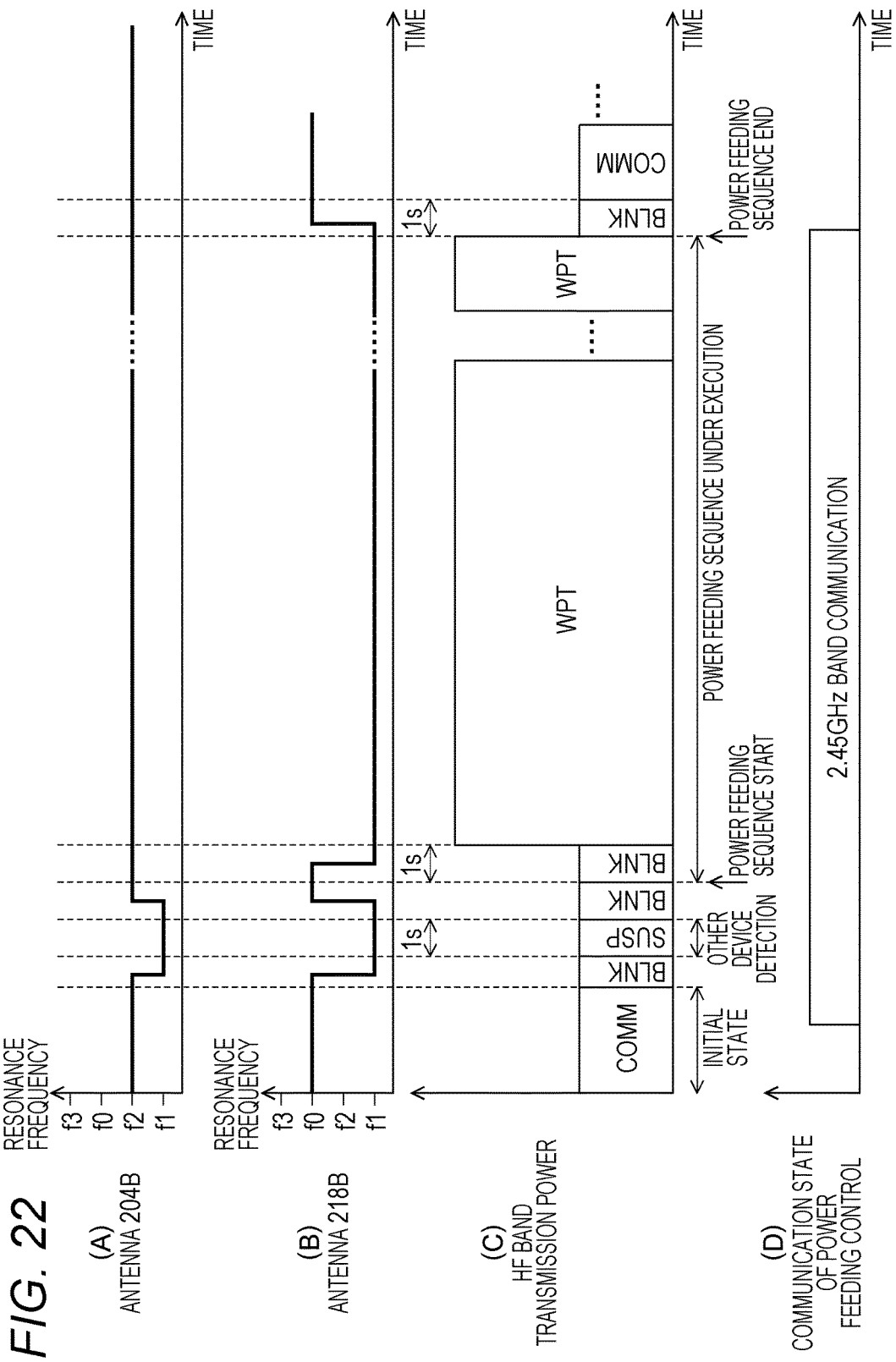

POWER RECEIVING APPARATUS FOR WIRELESSLY RECEIVING POWER FROM EXTERNAL APPARATUS

BACKGROUND

Field

Aspects of the present invention generally relate to a power receiving apparatus for wirelessly receiving power from an external apparatus.

Description of the Related Art

In wireless power transmission, electromagnetic waves radiated from an antenna of a power transmission apparatus (power transmission antenna) are received by an antenna of a power receiving apparatus (power receiving antenna) to drive the power receiving apparatus or charge a rechargeable battery of the power receiving apparatus. To prevent radiation of electromagnetic waves in an uncontrolled state, it is common practice that control information including wireless power transmission parameters is exchanged between the power transmission apparatus and the power receiving apparatus in advance, and the power transmission apparatus has power transmission/reception control incorporated therein for supplying power determined by the control information to the power receiving apparatus.

Among various frequencies for wireless power transmission, there is proposed a wireless power transmission method in which 6.78 MHz or 13.56 MHz of a HF (high frequency) band is used as a wireless power carrier frequency.

A contactless IC card uses 13.56 MHz of a HF band as a carrier frequency for wireless communication with a contactless IC card reader/writer. A power receiving apparatus can be mounted with a contactless IC function or a contactless IC reader/writer function.

A secondary harmonic 13.56 MHz of a wireless power transmission carrier frequency 6.78 MHz overlaps 13.56 MHz as a carrier frequency of a contactless IC function. Therefore, electromagnetic waves carrying power radiated from a power transmission apparatus might cause such an effect as overloading or heat generation to a contactless IC and a contactless IC reader/writer. Even when not mounted on a power receiving apparatus, a contactless IC card unintentionally located nearby might be given such an effect of heat generation by a wireless power transmission carrier or the like as well.

Japanese Patent Laid-Open No. 2012-65455 recites that while receiving strong electromagnetic waves exceeding a predetermined value by a power receiving coil, a resonance frequency of a communication antenna used in close proximity contactless communication is shifted to reduce a voltage applied to an IC chip connected to the communication antenna.

Japanese Patent Laid-Open No. 2014-33504 recites protecting a communication circuit by cutting off a switch between a communication antenna and the communication circuit while a rechargeable battery of a power receiving apparatus is charged by wireless power transmission.

In the technique recited in Japanese Patent Laid-Open No. 2012-65455, an electromagnetic wave (communication signal) in close proximity contactless communication causes both a communicating coil and a power receiving coil to generate an induced current, so that the induced current generated on the power receiving coil side will be lost. This contributes to a reduction of a communication distance in close proximity contactless communication.

In the technique recited in Japanese Patent Laid-Open No. 2014-33504, the switch located between the communication antenna and the communication circuit serves as a loss of an induced current generated at the communication antenna during communication, which also contributes to a reduction of a communication distance.

In both the techniques recited in Japanese Patent Laid-Open No. 2012-65455 and Japanese Patent Laid-Open No. 2014-33504, at least one coil or antenna is in a state of resonance with a frequency of an electromagnetic wave from a power transmission apparatus during close proximity contactless communication and during a charging period. This makes it difficult to detect an unintentional location of a contactless IC card equipped with an antenna resonating with this frequency.

SUMMARY

A power receiving apparatus includes a first antenna, a second antenna, and a control unit configured to execute control to exclusively and alternately execute power reception processing of wirelessly obtaining power from a power transmission apparatus via the first antenna and communication processing of wirelessly communicating with the power transmission apparatus via the second antenna, wherein during execution of the communication processing, the control unit executes control to set a resonance frequency of the first antenna to be a frequency lower than a carrier frequency band of the second antenna for the execution of the communication processing.

Further features of aspects of the present invention will become apparent from the following description of exemplary embodiments with reference to the attached drawings.

BRIEF DESCRIPTION OF THE DRAWINGS

FIG. 4 is a table illustrating examples of resonance frequencies of a Rx power receiving antenna and a Rx communication antenna in the Example 1.

FIG. 6 is a table illustrating examples of a configuration and contents of control data (apparatus status information) transmitted and received between the power transmission apparatus and the power receiving apparatus in the Example 1.

FIG. 8 is a timing chart of an example of a power transmission control sequence in the Example 1.

FIG. 10 is a table illustrating examples of resonance frequencies of a Rx power receiving antenna and a Rx communication antenna in the Example 2.

FIG. 12 is a table illustrating examples of a configuration and contents of control data (apparatus status information) transmitted and received between a power transmission apparatus and the power receiving apparatus in the Example 2.

FIG. 13 is a timing chart of an example of a power transmission control sequence in the Example 2.

FIG. 15 is a table illustrating examples of resonance frequencies of a Rx power receiving antenna and a Rx communication antenna in a case where power transmission and control data communication are conducted at the same carrier frequency in the Example 3.

FIG. 16 is a table illustrating examples of resonance frequencies of the Rx power receiving antenna and the Rx communication antenna in a case where power transmission and control data communication are conducted at carrier frequencies different from each other in the Example 3.

FIG. 17 is a timing chart of an example of a power transmission control sequence in wireless power transmission conducted according to the flow charts illustrated in FIG. 5A and FIG. 5B in the Example 3.

FIG. 18 is a timing chart of an example of a power transmission control sequence in wireless power transmission conducted according to the flow charts illustrated in FIG. 11A and FIG. 11B in the Example 3.

FIG. 19 is a table illustrating examples of resonance frequencies of a Rx power receiving antenna and a Rx communication antenna in a case where power transmission and control data communication are conducted at the same carrier frequency in an Example 4.

FIG. 20 illustrates examples of resonance frequencies of the Rx power receiving antenna and the Rx communication antenna in a case where power transmission and control data communication are conducted at carrier frequencies different from each other in the Example 4.

FIG. 21 is a timing chart of an example of a power transmission control sequence corresponding to FIG. 19.

FIG. 22 is a timing chart of an example of a power transmission control sequence corresponding to FIG. 20.

DESCRIPTION OF THE EMBODIMENTS

In the following, examples of aspects of the present invention will be described in detail with reference to the drawings. The aspects of the present invention are not limited to configurations of examples that will be described below. In the present specification, power received by a power receiving apparatus relative to power transmitted by a power transmission apparatus will be referred to as transmitted/received power or feeding power, and a ratio of power transmitted by the power transmission apparatus to power received by the power receiving apparatus will be referred to as a power feeding efficiency.

Example 1

Description will be made of an Example 1 applied to a wireless power transmission system in which wireless communication between a power transmission apparatus and a power receiving apparatus and wireless power transmission are conducted at the same carrier frequency. In the present Example 1, an antenna for wireless communication and an antenna for power reception of the power receiving apparatus are time-divisionally switched at the time of wireless communication and at the time of wireless power transmission to conduct wireless power transmission.

Figure 1:
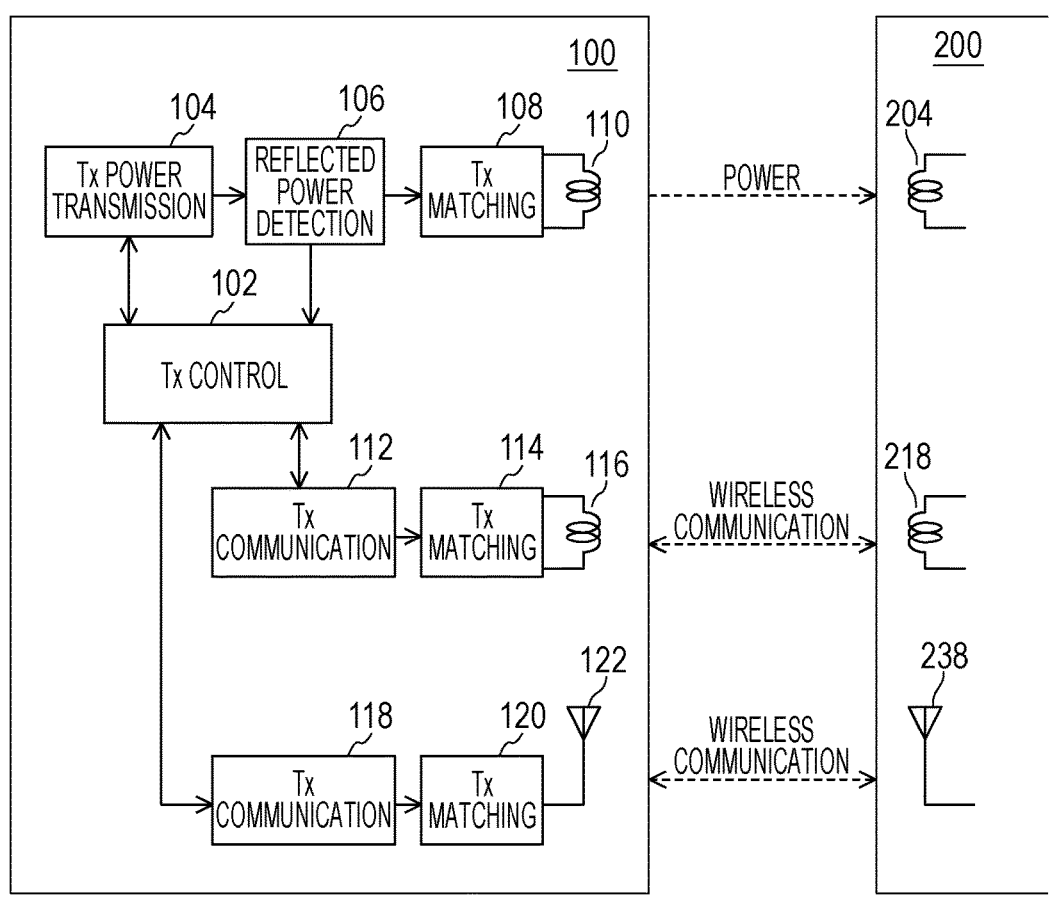
FIG. 1 is a block diagram illustrating a schematic configuration of a power transmission apparatus configuring a wireless power transmission system of an Example 1.
Figure 2:
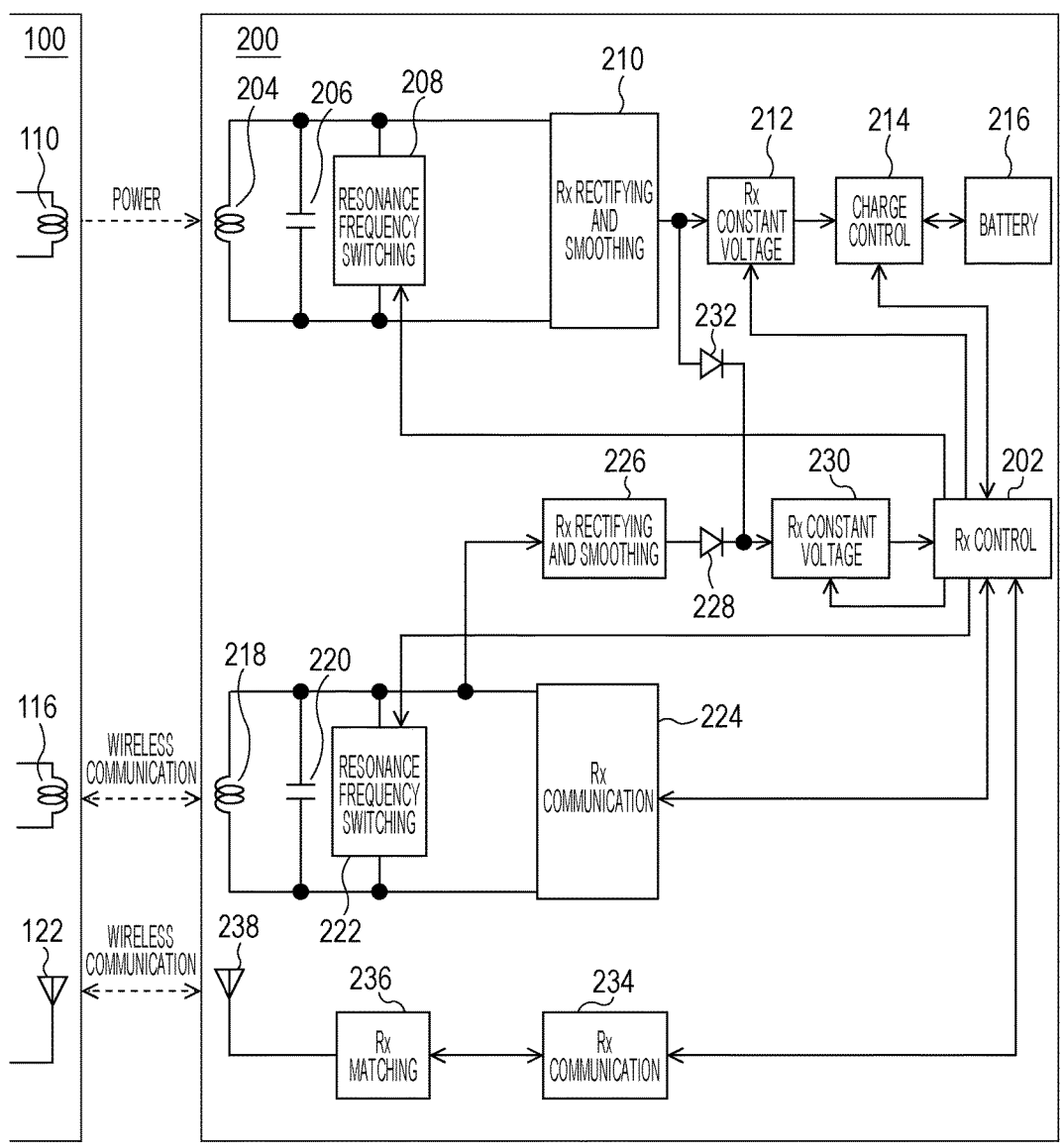
FIG. 2 is a block diagram illustrating a schematic configuration of a power receiving apparatus of the Example 1.

FIG. 1 is a block diagram illustrating a schematic configuration of a power transmission apparatus configuring a wireless power transmission system according to the present invention, and FIG. 2 is a block diagram illustrating a schematic configuration of a power receiving apparatus. A power transmission apparatus 100 illustrated in FIG. 1 wirelessly transmits power to a power receiving apparatus 200 illustrated in FIG. 2. In FIG. 1 and FIG. 2, illustration is made only of components whose characteristic functions in the present Example 1 will be described in order to facilitate understanding.

Description will be made of a configuration of the power transmission apparatus 100 illustrated in FIG. 1. A Tx control unit (power transmission control unit) 102 controls wireless power transmission of the power transmission apparatus 100. The Tx control unit 102 is configured with a CPU, a RAM (Random Access Memory) for use as a work area and a ROM (Read Only Memory) for storing a processing procedure.

A Tx power transmission unit 104 is a circuit that generates power to be supplied to the power receiving apparatus 200, which is mainly configured with a transistor amplification circuit, a quartz oscillation circuit and the like. An output of the Tx power transmission unit 104 is supplied to a Tx power transmission antenna 110 via a reflected power detection circuit 106 and a Tx matching circuit 108.

The reflected power detection circuit 106 detects a traveling wave and a reflected wave of electromagnetic waves (a power signal which carries power) radiated externally from the Tx power transmission antenna 110 as a traveling wave voltage VF and a reflected wave voltage VR, respectively. The reflected power detection circuit 106 is configured with, for example, a CM type directional coupler. Since a CM type directional coupler is a common circuit, no description will be made thereof.

The Tx matching circuit 108 is a circuit which matches an impedance between the Tx power transmission unit 104 and the Tx power transmission antenna 110. An impedance matching degree of the Tx matching circuit 108 can be adjusted by control of the Tx control unit 102. Tx matching circuit 108 includes a protection circuit configured to prevent generation of an excess voltage at the time of wireless power transmission.

The Tx power transmission antenna 110 is an antenna that radiates electromagnetic waves that carry power toward a power receiving apparatus (the power receiving apparatus 200 here). The Tx power transmission antenna 110 has a resonance frequency in the vicinity of, for example, 6.78 MHz or 13.56 MHz in a HF band.

A Tx communication unit 112 is a communication unit that communicates control data of wireless power transmission with other apparatuses, i.e., the power receiving apparatus 200, by a close proximity wireless communication method, which unit is here in conformity to a communication method applied to a contactless IC.

Specifically, the Tx communication unit 112 is a contactless IC or a contactless IC reader/writer that reads and writes data from/to a contactless IC. The close proximity wireless communication conducted by the Tx communication unit 112 is compatible with ISO/IEC21481 as an international standard.

A Tx communication matching circuit 114 is a circuit that matches an impedance between the Tx communication unit 112 and an Tx communication antenna 116. The Tx communication matching circuit 114 can be a circuit having an impedance matching degree adjustable by control of the Tx control unit 102, or can be a fixed constant circuit with a fixed impedance matching degree. The Tx communication matching circuit 114 includes a protection circuit configured to prevent generation of an excess voltage.

Tx communication antenna 116 is an antenna that conducts close proximity wireless communication with other apparatuses, i.e., the power receiving apparatus 200. The Tx communication antenna 116 is an antenna having a resonance frequency in the vicinity of, for example, 13.56 MHz in a HF band.

A Tx communication unit 118 is a communication unit that transmits/receives control data of wireless power transmission with other apparatuses, i.e., the power receiving apparatus 200, by short-distance wireless communication. A Tx communication matching circuit 120 is a circuit that matches an impedance between the Tx communication unit 118 and a Tx communication antenna 122. The Tx communication matching circuit 120 can be a circuit having an impedance matching degree adjustable by control of the Tx control unit 102, or may be a fixed constant circuit with a fixed impedance matching degree. The Tx communication matching circuit 120 includes a protection circuit configured to prevent generation of an excess voltage.

A Tx communication antenna 122 is an antenna that conducts short-distance wireless communication with other apparatuses, i.e., the power receiving apparatus 200. The Tx communication antenna 122 is an antenna having a resonance frequency in the vicinity of, for example, 2.45 GHz in a UHF band.

The Tx communication unit 118 and the Tx communication antenna 122 are compatible with Bluetooth® Low Energy as a short-distance wireless standard.

A configuration of the power receiving apparatus 200 will be described with reference to FIG. 2. The power receiving apparatus 200 receives power wirelessly transmitted from the power transmission apparatus 100 and charges a rechargeable battery contained therein to operate equipment contained therein.

A Rx control unit (power reception control unit) 202 is a control unit in charge of wireless power transmission control of the power receiving apparatus 200.

The Rx control unit 202 is configured with a CPU, a RAM (Random Access Memory) for use as a work area and a ROM (Read Only Memory) for storing a processing procedure.

A Rx power receiving antenna 204 is an antenna to be paired with the Tx power transmission antenna 110 of the power transmission apparatus 100 and receives electromagnetic waves that carry power radiated from the Tx power transmission antenna 110. Connected to the Rx power receiving antenna 204 in parallel is a capacitor 206 that forms a LC resonance circuit with the Rx power receiving antenna 204. A resonance frequency switching circuit 208 is a circuit that changes a capacitance value according to a control signal from the Rx control unit 202. The Rx control unit 202 changes a resonance frequency of the Rx power receiving antenna 204 to a predetermined value within or outside a carrier frequency range by the resonance frequency switching circuit 208.

A Rx rectifying and smoothing circuit 210 is a circuit that rectifies an AC voltage induced at the Rx power receiving antenna 204 by a power wave from the power transmission apparatus 100 to a DC voltage. A Rx constant voltage circuit 212 makes the DC voltage output from the Rx rectifying and smoothing circuit 210 be a constant voltage and supplies the obtained constant DC voltage to a charge control circuit 214. The charge control circuit 214 charges a rechargeable battery 216 with the DC voltage from the Rx constant voltage circuit 212, as well as functioning as a power source for the respective units including the Rx control unit 202 in the power receiving apparatus 200. The rechargeable battery 216 is, for example, a one-cell lithium-ion battery.

A Rx communication antenna 218 is an antenna to be paired with the Tx communication antenna 116. Connected to the Rx communication antenna 218 in parallel is a capacitor 220 that forms a LC resonance circuit with the Rx communication antenna 218. A resonance frequency switching circuit 222 is a circuit that changes a capacitance value according to a control signal from the Rx control unit 202. The Rx control unit 202 changes a resonance frequency of the Rx communication antenna 218 to a predetermined value within or outside a carrier frequency range by the resonance frequency switching circuit 222.

A Rx communication unit 224 is a communication unit corresponding to the Tx communication unit 112 of the power transmission apparatus 100, which is a unit for transmitting/receiving control data of wireless power transmission with the power transmission apparatus 100. For example, when the Tx communication unit 112 is assumed to be a contactless IC, the Rx communication unit 224 is assumed to be a contactless IC reader/writer that reads and writes data from/to the contactless IC. Conversely, when the Rx communication unit 224 is assumed to be a contactless IC, the Tx communication unit 112 is assumed to be a contactless IC reader/writer that reads and writes data from/to the contactless IC.

A Rx rectifying and smoothing circuit 226 is a circuit that rectifies an AC voltage induced at the Rx communication antenna 218 to a DC voltage. An output DC voltage of the Rx rectifying and smoothing circuit 226 is applied to a Rx constant voltage circuit 230 via a forward diode 228. To an input of the Rx constant voltage circuit 230, an output DC voltage of the Rx rectifying and smoothing circuit 210 is also applied via a forward diode 232. The Rx constant voltage circuit 230 makes a DC voltage input from the Rx rectifying and smoothing circuit 226 via the diode 228 and a DC voltage input from the Rx rectifying and smoothing circuit 210 via the diode 232 be constant voltages and supplies the obtained constant DC voltages to the charge control circuit 214. Cathode sides of the diodes 228 and 232 are wired-OR connected, i.e. connected to the same input terminal of the Rx constant voltage circuit 230. The diodes 228 and 232 enable not only the Rx power receiving antenna 204 but also the Rx communication antenna 218 in the power receiving apparatus 200 to wirelessly receive power supplied from the power transmission apparatus 100.

The Rx rectifying and smoothing circuit 226 has as low an inductance component or capacitance component that does not affect the close proximity wireless communication by the Rx communication antenna 218. The Rx control unit 202 temporarily stops operation of the Rx constant voltage circuit 230 so as not to affect the close proximity wireless communication by the Rx communication antenna 218. In a stopped state, the Rx constant voltage circuit 230 consumes no power. The Rx control unit 202 stops operation of the Rx constant voltage circuit 230, for example, when the rechargeable battery 216 has a sufficient remaining capacity and close proximity wireless communication is conducted with the power transmission apparatus 100 or other apparatuses using the Rx communication unit 224.

A Rx communication unit 234, a Rx communication matching circuit 236 and a Rx communication antenna 238 are communication units corresponding to the Tx communication unit 118, the Tx communication matching circuit 120 and the Tx communication antenna 122 of the power transmission apparatus 100, respectively. The Rx communication unit 234 transmits/receives control data of the wireless power transmission to/from the power transmission apparatus 100. The Rx communication matching circuit 236 is a circuit that matches an impedance between the Rx communication unit 234 and the Rx communication antenna 238. The Rx communication matching circuit 236 can be a circuit having an impedance matching degree adjustable by control of the Rx control unit 202, or can be a fixed constant circuit with a fixed impedance matching degree. The Rx communication matching circuit 236 includes a protection circuit configured to prevent generation of an excess voltage. Similarly to the Tx communication antenna 122, the Rx communication antenna 238 is an antenna having a resonance frequency in the vicinity of 2.45 GHz in a UHF band.

The Rx communication unit 234 and the Rx communication antenna 238 are compatible with Bluetooth® Low Energy as a short-distance wireless standard.

FIG. 3A to FIG. 3E illustrate circuit examples of the resonance frequency switching circuits 208 and 222.

Figure 3A:
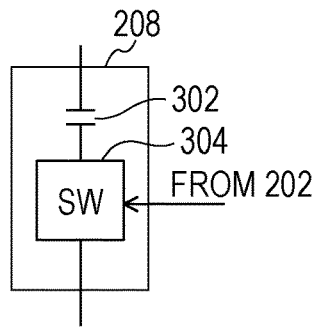
FIG. 3A, FIG. 3B, FIG. 3C, FIG. 3D, and FIG. 3E illustrate circuit examples of a resonance frequency switching circuit.

In the circuit example illustrated in FIG. 3A, a capacitor 302 and a switch 304 are connected in series, where the series circuit is connected to the Rx power receiving antenna 204 or the Rx communication antenna 218 in parallel. A capacitance value of the resonance frequency switching circuit 208, 222 can be changed by on-off control of the switch 304 by the Rx control unit 202.

Figure 3B:
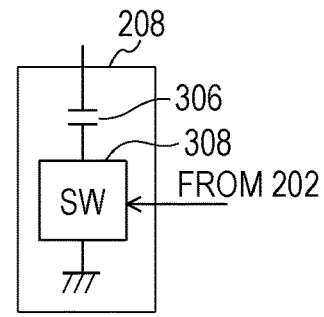

In the circuit example illustrated in FIG. 3B, a capacitor 306 and a switch 308 are connected in series, one end of the series circuit is connected to the Rx power receiving antenna 204 or the Rx communication antenna 218 and the other end connected to a ground. The capacitance value of the resonance frequency switching circuit 208, 222 can be changed by on-off control of the switch 308 by the Rx control unit 202.

Figure 3C:
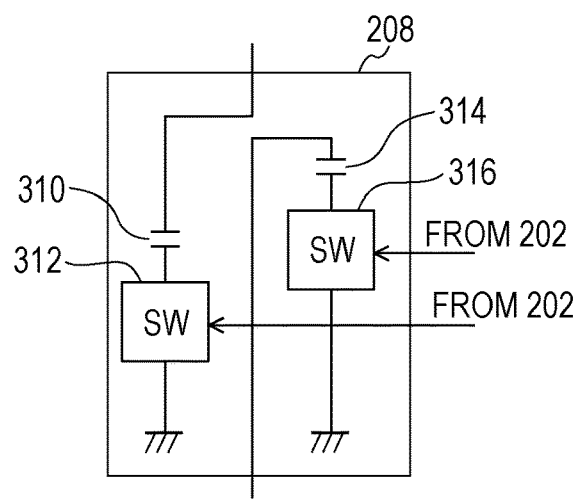

In the circuit example illustrated in FIG. 3C, one end of the Rx power receiving antenna 204 or the Rx communication antenna 218 is connected to the ground via a series circuit of a capacitor 310 and a switch 312. The other end of the Rx power receiving antenna 204 or the Rx communication antenna 218 is connected to the ground via a series circuit of a capacitor 314 and a switch 316. The capacitance value of the resonance frequency switching circuit 208, 222 can be changed by individual on-off control of the switches 312 and 316 by the Rx control unit 202.

Figure 3D:
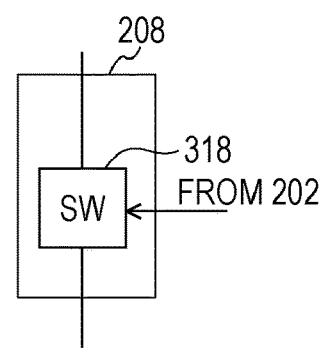

In the circuit example illustrated in FIG. 3D, which includes only a switch 318, the switch 318 is connected to the Rx power receiving antenna 204 or the Rx communication antenna 218 in parallel. Turning on the switch 304 by the Rx control unit 202 enables the Rx power receiving antenna 204 or the Rx communication antenna 218 to be shorted during the time.

Figure 3E:
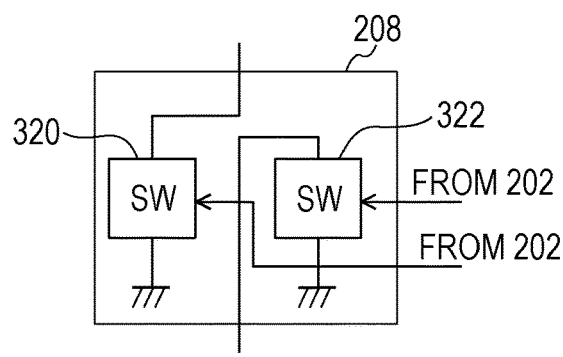

In the circuit example illustrated in FIG. 3E, one end of the Rx power receiving antenna 204 or the Rx communication antenna 218 is connected to the ground via a switch 320 and the other end connected to the ground via a switch 322. Individual on-off control of the switches 320 and 322 by the Rx control unit 202 enables one end or both ends of the Rx power receiving antenna 204 or the Rx communication antenna 218 to be grounded.

Applicable as the switches 304, 308, 312, 316, 318, 320 and 322 is any element whose conduction (on) and non-conduction (off) can be externally controlled, the element being configured with, for example, a PIN diode, a transistor, or a MEMS switch.

When the resonance frequency switching circuit 208 is non-conductive, the resonance frequency of the Rx power receiving antenna 204 is set to be in the vicinity of 20 MHz in a HF band, which will be an initial value. Additionally, when the antenna resonance frequency switching circuit 222 is non-conductive, the resonance frequency of the Rx communication antenna 218 is set to be in the vicinity of 13.56 MHz in a HF band, which will be an initial value.

FIG. 4 illustrates examples of the resonance frequencies of the Rx power receiving antenna 204 and the Rx communication antenna 218 in each state of the power receiving apparatus 200. Numerical values indicated in the table illustrated in FIG. 4 as the resonance frequencies of the Rx power receiving antenna 204 and the Rx communication antenna 218 are for an explanation purpose only, and aspects of the present invention are not limited to these numerical values. The power receiving apparatus 200 communicates power transmission control data and has a wireless communication state where backup power can be received, a power transmission/reception state where power supplied from the power transmission apparatus 100 is received, a temporarily stopped state, and a transition state between these states.

The wireless communication state will be referred to as a COMM state as an abbreviation of "COMMUNICATION". The resonance frequency of the Rx power receiving antenna 204 is represented as f3 and the resonance frequency of the Rx communication antenna 218 is represented as f0. The resonance frequency of the Rx power receiving antenna 204 is set to be a frequency higher or lower than a carrier frequency of close proximity wireless communication so as not to resonate with the carrier frequency of the close proximity wireless communication. The resonance frequency of the Rx communication antenna 218 is set to be in the vicinity of the carrier frequency of the close proximity wireless communication so as to resonate with the carrier frequency of the close proximity wireless communication, thereby enabling communication. This is an initial state before starting or after the end of a power feeding sequence in which wireless power transmission is conducted between the power transmission apparatus 100 and the power receiving apparatus 200. When the resonance frequency switching circuits 208 and 222 have the circuit configuration as illustrated in FIG. 3A, the switch 304 is off in the COMM state.

The power transmission/reception state will be referred to as a WPT state as an abbreviation of "WIRELESS POWER TRANSFER". The resonance frequency of the Rx power receiving antenna 204 is represented as f0 and the resonance frequency of the Rx communication antenna 218 is represented as f1. The resonance frequency of the Rx power receiving antenna 204 is set to be a frequency within a carrier frequency band of the wireless power transmission so as to receive power while resonating with the carrier frequency of the wireless power transmission. The resonance frequency of the Rx communication antenna 218 is set to be a frequency lower than the carrier frequency of the wireless power transmission so as not to resonate with the carrier frequency of the wireless power transmission and so as not to be tuned with a harmonic of the carrier frequency of the wireless power transmission. When the resonance frequency switching circuits 208 and 222 have the circuit configuration as illustrated in FIG. 3A, the switch 304 is on in the WPT state.

The temporarily stopped state will be referred to as a SUSP state as an abbreviation of "SUSPEND". The resonance frequency of the Rx power receiving antenna 204 is represented as f3 and the resonance frequency of the Rx communication antenna 218 is represented as f1. The resonance frequencies of the Rx power receiving antenna 204 and the Rx communication antenna 218 are set to be a frequency higher/lower than any of the carrier frequency of the close proximity wireless communication and the carrier frequency of the wireless power transmission so as not to resonate with any of these carrier frequencies. The power receiving apparatus 200 enters the SUSP state before the power feeding sequence starts in which wireless power transmission is conducted between the power transmission apparatus 100 and the power receiving apparatus 200. Additionally, after the start of the power feeding sequence, when the power feeding sequence is temporarily stopped for detecting a contactless IC card as other device, the power receiving apparatus 200 also enters the SUSP state. When the resonance frequency switching circuits 208 and 222 have the circuit configuration as illustrated in FIG. 3A, in the SUSP state, the switch 304 of the resonance frequency switching circuit 208 is off, and the switch 304 of the resonance frequency switching circuit 222 is on.

The temporarily stopped state includes a blank state during a transition among the COMM state, the WPT state and the SUSP state, and a waiting state at a start and at an end of the power feeding sequence, and will be referred to as a BLNK state as an abbreviation of "BLANKING". The resonance frequency of the Rx power receiving antenna 204 and the resonance frequency of the Rx communication antenna 218 have the same value as that in an indefinite state during switching or that in the COMM state.

Figure 5A:
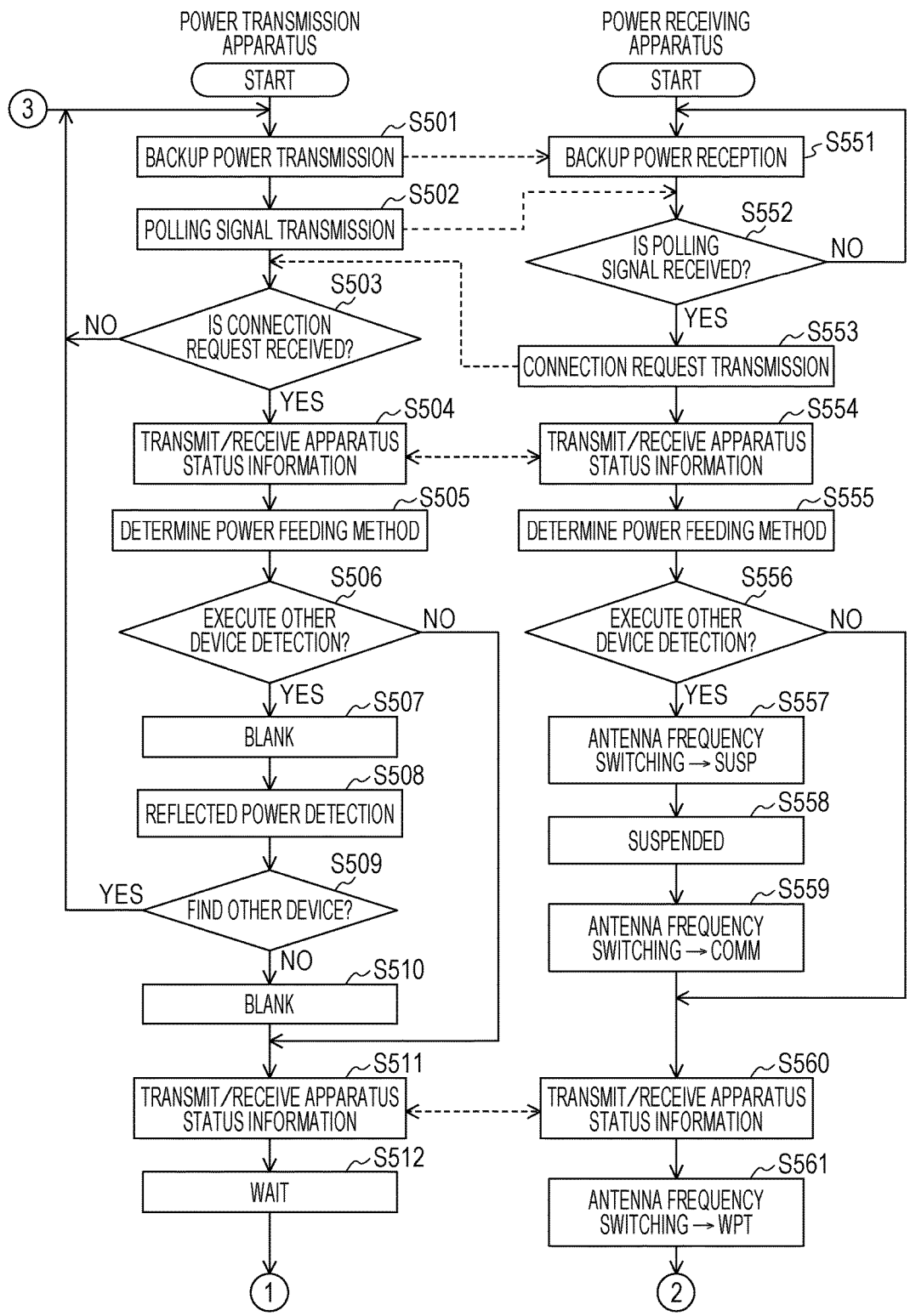
FIG. 5A is a flow chart illustrating a procedure of wireless power transmission of the Example 1.
Figure 5B:
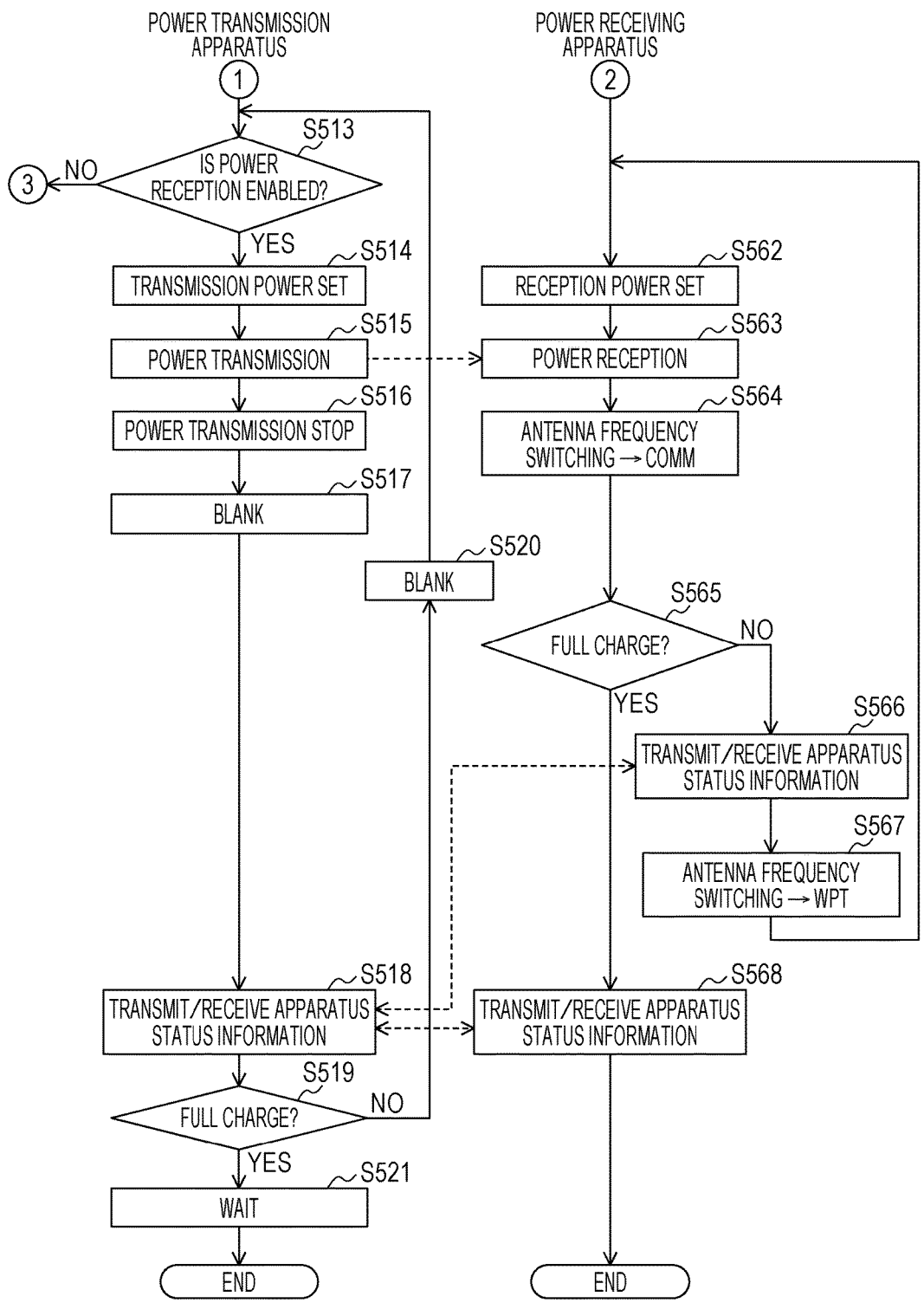
FIG. 5B is a flow chart subsequent to FIG. 5A.

FIG. 5A and FIG. 5B are flow charts illustrating a procedure of wireless power transmission from the power transmission apparatus 100 to the power receiving apparatus 200. Unless otherwise noted, processing of the power transmission apparatus 100 is executed by the Tx control unit 102 and processing of the power receiving apparatus 200 is executed by the Rx control unit 202. Communication of control data (apparatus status information) for controlling power transmission between the power transmission apparatus 100 and the power receiving apparatus 200 is conducted between the Tx communication unit 112 and the Rx communication unit 224.

FIG. 6 illustrates examples of a configuration and contents of the control data (apparatus status information) transmitted and received between the power transmission apparatus 100 and the power receiving apparatus 200 in the flow charts illustrated in FIG. 5A and FIG. 5B. The power transmission apparatus 100 stores the apparatus status information in the Tx control unit 102 and the power receiving apparatus 200 stores the apparatus status information in the Rx control unit 202.

Figure 7A:
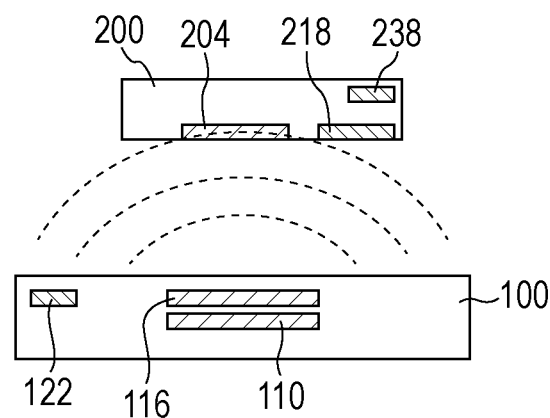
FIG. 7A and FIG. 7B illustrate arrangement examples of the power transmission apparatus and the power receiving apparatus.
Figure 7B:
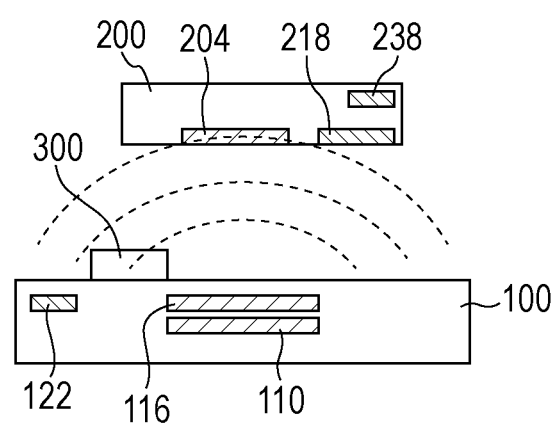

FIG. 7 illustrates arrangement examples of the power transmission apparatus 100 (Tx power transmission antenna 110) and the power receiving apparatus 200 (Rx power receiving antenna 204). Both FIG. 7A and FIG. 7B illustrate an arrangement example where the power receiving apparatus 200 is located in front of the power transmission apparatus 100 so that wireless power transmission is enabled from the power transmission apparatus 100 to the power receiving apparatus 200. In FIG. 7B, however, a contactless IC card 300 is located between the power transmission apparatus 100 and the power receiving apparatus 200. The contactless IC card 300 is equipped with an antenna having a resonance frequency in the vicinity of 13.56 MHz in a HF band, in which at a carrier frequency of 13.56 MHz, operation power is ensured and close proximity wireless communication is conducted.

FIG. 8 illustrates a timing chart of the power transmission control sequence illustrated in FIG. 5A and FIG. 5B. FIG. 8(A) illustrates an example of a change in the resonance frequency of the Rx power receiving antenna 204. FIG. 8(B) illustrates an example of a change in the resonance frequency of the Rx communication antenna 218. FIG. 8(C) illustrates an example of a change in transmission power of a HF band output from the power transmission apparatus 100. FIG. 8(D) illustrates an example of a change in a communication state of power feeding control and in a carrier frequency used herein.

Operation of the power transmission apparatus 100 will be described with reference to FIG. 5A, FIG. 5B, FIG. 8(C), and FIG. 8(D).

At S501, the Tx control unit 102 controls the Tx power transmission unit 104 to transmit backup power. Here, it is assumed that a frequency of the backup power is set to be 13.56 MHz and transmission power is set to have an arbitrary value of 0.25 W, for example. The power of the backup power transmission can have a magnetic field intensity equivalent to 6.0 A/m at 13.56 MHz at an interface between an inner part and an outer part of the power transmission apparatus 100. The power of the backup power transmission preferably has a value less than a magnetic field intensity allowed for the contactless IC card 300 or less than power of an aerial wire.

At S502, the Tx control unit 102 externally transmits a polling signal through close proximity wireless communication of the Tx communication unit 112 and at S503, determines whether a connection request response from the power receiving apparatus (the power receiving apparatus 200 here) is present. In the close proximity wireless communication used in S502, using a JISX6319-4 request command as an example, the power receiving apparatus 200 is captured. Since the protocol of JISX6319-4 is a common method, no description will be made thereof. Thus, transmitting a polling signal by the power transmission apparatus 100 and responding to the polling signal by the power receiving apparatus 200 results in the power transmission apparatus 100 finding the power receiving apparatus 200 to start communication with the power receiving apparatus 200 by the close proximity wireless communication.

At S503, the Tx control unit 102 determines whether a connection request response from the power receiving apparatus 200 is present. When receiving no connection request response from the power receiving apparatus 200 (S503), the Tx control unit 102 returns to S101 to execute backup power transmission. When determining at S503 that a connection request from the power receiving apparatus 200 is present, the Tx control unit 102 transmits/receives apparatus status information to/from the power receiving apparatus 200 at S504. Specifically, respective information of "power feeding method", "coping with other device detection", "power reception enabled/disabled", "maximum received power", "power transmission/reception request power" and "blank time" of the apparatus status information are transmitted and/or received.

At S505, the Tx control unit 102 determines a power feeding method for the power receiving apparatus 200 according to the "power feeding method" of the apparatus status information received at S504. Here, power is wirelessly transmitted centered around the frequency f0=13.56 MHz, and communication of the power feeding control data is conducted within a carrier frequency band of power transmission centered around 13.56 MHz. Specifically, in the Example 1, since the wireless power feeding and the wireless communication of power feeding control are conducted at the same frequency band, the wireless power feeding and the communication are executed separately from each other in time so as not to interfere with each other.

At S506, the Tx control unit 102 determines whether to execute other device detection in synchronization with the power receiving apparatus 200 according to "coping with other device detection" of the apparatus status information received at S504. "Other device" in the other device detection represents other power receiving apparatuses than the power receiving apparatus 200 as a wireless power feeding target, such as the contactless IC card 300, for example.

From S501 to S506, the power transmission apparatus 100 and the power receiving apparatus 200 are in the COMM state (FIG. 4) as illustrated in FIG. 8(C). The Tx control unit 102 determines that the power receiving apparatus 200 can cope with other device detection when "coping with other device detection" is "enabled" (S506), and determines that the power receiving apparatus 200 cannot cope with other device detection when the same is "disabled" (S506). When "coping with other device detection" of the power receiving apparatus 200 is disabled, S507 through S510 are skipped to proceed to S511.

When "coping with other device detection" of the power receiving apparatus 200 is "enabled" (S506), the Tx control unit 102 waits for a time set by "blank time" of the apparatus status information (0.5 seconds in FIG. 6) at S507. At S507, the power transmission apparatus 100 and the power receiving apparatus 200 are in the BLNK state (FIG. 4) as illustrated in FIG. 8(C). At subsequent S508, the Tx control unit 102 controls the Tx power transmission unit 104 to transmit power equivalent to the backup power, so that the reflected power detection circuit 106 detects a traveling wave voltage VF and a reflected wave voltage VR of power output from the Tx power transmission antenna 110. At S508, the power transmission apparatus 100 and the power receiving apparatus 200 are in the SUSP state (FIG. 4) as illustrated in FIG. 8(C). Tx control unit 102 calculates, for example, a standing wave ratio VSWR, based on the traveling wave voltage VF and the reflected wave voltage VR detected at S508.

At S509, the Tx control unit 102 compares the standing wave ratio VSWR with a threshold value thereof to determine whether other device is present in the vicinity of the Tx power transmission antenna 110. When the power transmission apparatus 100 transmits power equivalent to the backup power, if other device that absorbs power of a HF band is present in the vicinity of the Tx power transmission antenna 110, VSWR is reduced in general. Here, VSWR is assumed to be less than or equal to 3 for the purpose of the present description. When the power transmission apparatus 100 transmits power equivalent to the backup power, if other device that absorbs power of a HF band is not present in the vicinity of the Tx power transmission antenna 110, VSWR is increased in general. Here, VSWR is assumed to be greater than or equal to 6 for the purpose of the present description. Accordingly, the Tx control unit 102 can determine presence/absence of other device by setting the threshold value of the standing wave ratio VSWR to be 4, for example.

When determining that other device is present (S509), the Tx control unit 102 returns to S501 to execute backup power transmission. When determining that no other device is present (S509), the Tx control unit 102 waits for the time set by "blank time" (0.5 seconds in FIG. 6) at S510. At S510, the power transmission apparatus 100 and the power receiving apparatus 200 are in the BLNK state (FIG. 4) as illustrated in FIG. 8(C).

At S511, the Tx control unit 102 transmits/receives the apparatus status information including information of "power reception enabled/disabled", "power feeding sequence waiting time" and "power feeding and communication time" to/from the power receiving apparatus 200. At S511, the power transmission apparatus 100 and the power receiving apparatus 200 are in the COMM state (FIG. 4) as illustrated in FIG. 8(C). The "power feeding and communication time" information defines lengths of a power transmission period for transmitting power and a communication period for communicating control data, respectively.

At S512, the Tx control unit 102 waits for a time (one second in FIG. 6) set by "power feeding sequence waiting time" of the apparatus status information. At S512, the power transmission apparatus 100 and the power receiving apparatus 200 are in the BLNK state (FIG. 4) as illustrated in FIG. 8(C).

At S513, the Tx control unit 102 determines whether the power receiving apparatus 200 is in a state that enables reception of wireless power based on the "power reception enabled/disabled" information of the apparatus status information received at S511. When the power receiving apparatus 200 is not in the state enabling reception of wireless power (S513), the Tx control unit 102 returns to S501 to execute backup power transmission. When the power receiving apparatus 200 is in the state enabling reception of wireless power (S513), the Tx control unit 102 proceeds to S514.

At S514, according to the respective information of "maximum received power" and "power transmission/reception request power" of the apparatus status information transmitted or received at S504, the Tx control unit 102 sets power transmission/reception set power without exceeding a range of "maximum received power". In the example as illustrated in FIG. 6, the power transmission/reception set power to be set at S514 is 2.8 W according to the information of "power transmission/reception request power" transmitted from the power receiving apparatus 200. Additionally, at S515, the Tx control unit 102 controls the Tx power transmission unit 104 to wirelessly feed power to the power receiving apparatus 200 for a power feeding time (six seconds in FIG. 6) set in the "power feeding and communication time" information of the apparatus status information. At S515, the power transmission apparatus 100 and the power receiving apparatus 200 are in the WPT state (FIG. 4) as illustrated in FIG. 8(C). At S515, the Tx control unit 102 sets the Tx matching circuit 108 to an impedance matching state appropriate for the wireless power transmission from the Tx power transmission unit 104. Although at the time of feeding power to the power receiving apparatus 200, the Tx control unit 102 sets the Tx matching circuit 108 to an impedance matching state appropriate for the wireless power transmission from the Tx power transmission unit 104, no description will be made thereof.

At S516, the Tx control unit 102 stops the wireless power transmission for six seconds and at S517, waits for a time set by "blank time" of the apparatus status information (0.5 seconds in FIG. 6). At S517, the power transmission apparatus 100 and the power receiving apparatus 200 are in the BLNK state (FIG. 4) as illustrated in FIG. 8(C).

At S518, the Tx control unit 102 transmits/receives the apparatus status information to/from the power receiving apparatus 200 within a communication time (one second in FIG. 6) set in the "power feeding and communication time"

information of the apparatus status information. The information transmitted/received here includes the respective information of "power reception enabled/disabled", "battery voltage", "battery full charge voltage", "battery remaining capacity level", "power transmission/reception request power" and "power feeding and communication time". At S518, the power transmission apparatus 100 and the power receiving apparatus 200 are in the COMM state (FIG. 4) as illustrated in FIG. 8(C).

At S519, the Tx control unit 102 determines whether the rechargeable battery 216 of the power receiving apparatus 200 is in a full charge state according to "battery voltage" and "battery full charge voltage", or "battery remaining capacity level" of the apparatus status information received at S518. When the rechargeable battery 216 of the power receiving apparatus 200 is not in the full charge state (S519), the Tx control unit 102 waits for a time set by the "blank time" information of the apparatus status information at S520 (0.5 seconds in FIG. 6) and returns to S513. At S519, the power transmission apparatus 100 and the power receiving apparatus 200 are in the BLNK state (FIG. 4) as illustrated in FIG. 8(C).

When the rechargeable battery 216 of the power receiving apparatus 200 is in the full charge state (S519), the Tx control unit 102 waits for a time (one second in FIG. 6) set by the "power feeding sequence waiting time" information of the apparatus status information at S521 to end the flows illustrated in FIG. 5A and FIG. 5B. At S521, the power transmission apparatus 100 and the power receiving apparatus 200 are in the BLNK state (FIG. 4) as illustrated in FIG. 8(C).

Operation of the power receiving apparatus 200 will be described with reference to FIG. 5A, FIG. 5B, FIG. 8(A), and FIG. 8(B). In the initial state, the power receiving apparatus 200 is in the COMM state (FIG. 4) as illustrated in FIG. 8(A) and FIG. 8(B), which is assumed to be the initial state of the power receiving apparatus 200. In the COMM state, the resonance frequency of the Rx power receiving antenna 204 is represented as f3 (=20 MHz) and the resonance frequency of the Rx communication antenna 218 as f0 (=13.56 MHz).

At S551, the power receiving apparatus 200 receives backup power transmitted from the power transmission apparatus 100 to operate. The frequency of the backup power electromagnetically radiated from the power transmission apparatus 100 is 13.56 MHz as described above. Additionally, the resonance frequency of the Rx power receiving antenna 204 is represented as f3 (=20 MHz) and the resonance frequency of the Rx communication antenna 218 as f0 (=13.56 MHz). Accordingly, while the Rx power receiving antenna 204 does not resonate with the electromagnetic waves of the backup power and substantially receives no backup power accordingly, the Rx communication antenna 218 resonates with the electromagnetic waves of the backup power and selectively receives the backup power. The Rx communication antenna 218 receives the backup power transmitted from the power transmission apparatus 100, the Rx rectifying and smoothing circuit 226 rectifies and smooths a current from the Rx communication antenna 218, and the Rx constant voltage circuit 230 supplies the Rx control unit 202 and other units with a defined power source voltage. Thus, even when the rechargeable battery 216 fails to have sufficient power, the power receiving apparatus 200 can conduct minimum operation with the backup power from the power transmission apparatus 100. The operation will be described below.

At S552, the Rx control unit 202 determines whether the Rx communication unit 224 receives a polling signal of close proximity wireless communication from the power transmission apparatus 100. While receiving no polling signal, the power receiving apparatus 200 receives the backup power from the power transmission apparatus 100 at S551. When receiving the polling signal (S552), the Rx control unit 202 transmits a connection request at S553.

At S552, the power receiving apparatus 200 is in the COMM state. In the COMM state, since the Rx power receiving antenna 204 does not resonate with the carrier frequency of 13.56 MHz of the communication polling signal, the antenna does not substantially receive the communication polling signal and a carrier power thereof. However, the Rx communication antenna 218 resonates to receive the communication polling signal and the carrier power thereof. In other words, in the COMM state, a loss of carrier signal power caused by the Rx rectifying and smoothing circuit 210 can be reduced, resulting in maximizing a supply of the carrier signal power from the Rx communication antenna 218 to the Rx communication unit 224. As a result, a decrease in a communication distance of the Rx communication unit 224 can be prevented, thereby enabling close proximity wireless communication with the power transmission apparatus 100.

The power transmission apparatus 100 having received the connection request from the power receiving apparatus 200 executes connection processing with the power receiving apparatus 200. When the processing of S505 in the power transmission apparatus 100 and the processing of S553 in the power receiving apparatus 200 are completed, the power transmission apparatus 100 and the power receiving apparatus 200 enter a connection mode.

At S554, the Rx control unit 202 transmits/receives the apparatus status information to/from the power transmission apparatus 100 through close proximity wireless communication. The information transmitted/received includes the respective information of "power feeding method", "coping with other device detection", "power reception enabled/disabled", "maximum received power", "power transmission/reception request power" and "blank time".

At S555, the Rx control unit 202 determines a power feeding method for the wireless power transmission from the power transmission apparatus 100 according to the "power feeding method" information of the apparatus status information received at S554.

At S556, the Rx control unit 202 determines whether to execute other device detection in synchronization with the power receiving apparatus 200 according to the "coping with other device detection" information of the apparatus status information received at S554. When the "coping with other device detection" information is "disabled", the power transmission apparatus 100 cannot cope with the other device detection. In this case, the Rx control unit 202 skips S557 through S559 to proceed to S560.

When the "coping with other device detection" information of the apparatus status information received at S554 is "enabled", the power transmission apparatus 100 can cope with the other device detection. In this case, the Rx control unit 202 transitions to the SUSP state (FIG. 4) as illustrated in FIG. 8(A) and FIG. 8(B) for a time period (0.5 seconds in FIG. 6) as defined by the "blank time" information of the apparatus status information at S557. For making a transition to the SUSP state, the Rx control unit 202 controls the resonance frequency switching circuits 208 and 222 to switch the resonance frequency of the Rx power receiving antenna 204 to f3 (=20 MHz) and the resonance frequency of the Rx communication antenna 218 to f1 (−4 MHz).

At S558 subsequent to S557, the Rx control unit 202 maintains the SUSP state for one second. The SUSP state maintaining time can be a predetermined time or a time defined by the "power feeding sequence waiting time" information of the apparatus status information received at S554.

Power for controlling the resonance frequency switching circuits 208 and 222 required for maintaining the SUSP state can be covered by accumulating a part of the backup power received before a transition to the SUSP state. When accumulating a part of the backup power received before a transition to the SUSP state, power can be accumulated, for example, in any of an input capacitor and an output capacitor of the Rx constant voltage circuit 230 and an input capacitor of the Rx control unit 202.

At S558, the carrier frequency of the backup power received by the power receiving apparatus 200 is 13.56 MHz. Since the Rx power receiving antenna 204 in the SUSP state does not resonate with the carrier frequency of the backup power, the antenna does not substantially receive the backup power. Additionally, since in the SUSP state, the Rx communication antenna 218 does not resonate either, the antenna does not substantially receive the backup power. In other words, in the SUSP state (S558), all the antennas configuring the power receiving apparatus 200 enter a state of non-resonance with the backup power from the power transmission apparatus 100.

While the power receiving apparatus 200 maintains the SUSP state for one second at S558, the power transmission apparatus 100 detects the traveling wave voltage VF and the reflected wave voltage VR at S508 to determine whether other device is present at S509. As illustrated in FIG. 7A, when no device other than the power transmission apparatus 100 and the power receiving apparatus 200 is present, the power receiving apparatus 200 maintains the SUSP state, so that the power transmission apparatus 100 can determine that no other device resonating with the power frequency is present. As illustrated in FIG. 7B, when the contactless IC card 300 is located nearby, the power transmission apparatus 100 can recognize the contactless IC card 300 as another device resonating with the power frequency. Also when another power receiving apparatus in a state of resonance with the power frequency, for example, another power receiving apparatus not in the SUSP state, is present nearby, as a matter of course, the power transmission apparatus 100 can recognize the power receiving apparatus as another device.

At S559, the Rx control unit 202 transitions to the COMM state (FIG. 4) as illustrated in FIG. 8(A) and FIG. 8(B) during a time (0.5 seconds in FIG. 6) defined by the "blank time" information of the apparatus status information. For making a transition to the COMM state, the Rx control unit 202 controls the resonance frequency switching circuits 208 and 222 to switch the resonance frequency of the Rx power receiving antenna 204 to f3 (=20 MHz) and the resonance frequency of the Rx communication antenna 218 to f0 (=13.56 MHz). At S560, the Rx control unit 202 transmits/receives the apparatus status information including the respective information of "power reception enabled/disabled", "power feeding sequence waiting time", and "power feeding and communication time" to/from the power transmission apparatus 100.

At S561, the Rx control unit 202 transitions to the WPT state (FIG. 4) during a time (one second in FIG. 6) defined by the "power feeding sequence waiting time" information of the apparatus status information as illustrated in FIG. 8(A) and FIG. 8(B). After the transition to the WPT state at S561, the Rx control unit 202 time-divisionally executes power feeding (six seconds in FIG. 6) and communication (one second in FIG. 6) according to the "power feeding and communication time" information of the apparatus status information. The power receiving apparatus 200 is in the WPT state during the power feeding of six seconds, and is in the COMM state during the communication of one second. Between the WPT state and the COMM state, a time (0.5 seconds in FIG. 6) defined by the "blank time" information of the apparatus status information is set as time required for a state transition. In other words, the power feeding sequence uses the power feeding (six seconds), the communication (one second) and the blank (0.5 seconds) as a basic unit.

When making a transition from the COMM state to the WPT state, the Rx control unit 202 first switches the resonance frequency of the Rx power receiving antenna 204 to f0 (=13.56 MHz), and then, switches the resonance frequency of the Rx communication antenna 218 to f1 (=4 MHz). Specifically, with the backup power and the carrier power of the close proximity wireless communication, the resonance frequency of the Rx power receiving antenna 204 is first tuned and then, the resonance frequency of the Rx communication antenna 218 is detuned. Thus, by first tuning the resonance frequency of the Rx power receiving antenna 204 with the backup power and the carrier power of the close proximity wireless communication, the backup power and the carrier power of the close proximity wireless communication can be continuously supplied to the Rx control unit 202.

At S562, the Rx control unit 202 controls the charge control circuit 214 according to the "power transmission/reception request power" information of the apparatus status information to set a charge condition of the rechargeable battery 216 so as to be optimum for the "power transmission/reception request power" information. When the processing of S514 in the power transmission apparatus 100 and the processing of S562 in the power receiving apparatus 200 are completed, wireless power feeding is enabled between the power transmission apparatus 100 and the power receiving apparatus 200.

At S563, the Rx control unit 202 receives wirelessly supplied power from the power transmission apparatus 100 for six seconds according to the "power feeding and communication time" information of the apparatus status information. Since the frequency of the power received at S563 is 13.56 MHz, the Rx power receiving antenna 204 resonates to receive the power, and the Rx communication antenna 218 does not resonate and substantially receives no power. While the power receiving apparatus 200 is in the WPT state to receive the power, the Rx communication antenna 218 does not resonate with the power wave from the power transmission apparatus 100, and therefore fails to supply excess power to the Rx communication unit 224 at a subsequent stage. This enables the Rx communication unit 224 to be protected from such an effect as heat generation.

At S564, the Rx control unit 202 transitions to the COMM state (FIG. 4) as illustrated in FIG. 8(A) and FIG. 8(B) during a time (0.5 seconds in FIG. 6) defined by the "blank time" information of the apparatus status information. For making a transition to the COMM state, the Rx control unit 202 controls the resonance frequency switching circuits 208 and 222 to switch the resonance frequency of the Rx power receiving antenna 204 to f3 (=20 MHz) and the resonance frequency of the Rx communication antenna 218 to f0

(=13.56 MHz). When making a transition from the WPT state to the COMM state during a standby time (0.5 seconds), the Rx control unit 202 first switches the resonance frequency of the Rx communication antenna 218 to f0 and then switches the Rx power receiving antenna 204 to f3. Thus, by first tuning the resonance frequency of the Rx communication antenna 218 with the backup power and the carrier power of the close proximity wireless communication, the backup power and the carrier power of the close proximity wireless communication can be continuously supplied to the Rx control unit 202.

At S565, the Rx control unit 202 determines whether the rechargeable battery 216 is in a full charge state. When determining that the rechargeable battery 216 is in the full charge state (S565), the Rx control unit 202 sets the "power reception enabled/disabled" information of the apparatus status information to be "disabled" in order to notify the power transmission apparatus 100 that the rechargeable battery 216 is in the full charge state at S568. Then, the Rx control unit 202 notifies the power transmission apparatus 100 of full charge of the rechargeable battery 216 during a communication time according to "power feeding and communication time" of the apparatus status information. Specifically, the Rx control unit 202 transmits/receives the apparatus status information including the respective information of "power reception enabled/disabled", "battery voltage", "battery full charge voltage" and "battery remaining capacity level" to/from the power transmission apparatus 100. The Rx control unit 202 ends the processing of the flow charts illustrated in FIG. 5A and FIG. 5B after a lapse of the communication time (one second) defined by the "power feeding sequence waiting time" information of the apparatus status information. After the end of the flow charts, the power receiving apparatus 200 returns to the initial state, i.e. the COMM state (FIG. 4), as illustrated in FIG. 7A and FIG. 7B.

When determining that the rechargeable battery 216 is not in the full charge state (S565), the Rx control unit 202 obtains a latest charge state of the rechargeable battery 216, calculates power required for charging the rechargeable battery 216, and sets the calculated power to the "power transmission/reception request power" information. At S566, the Rx control unit 202 transmits/receives the apparatus status information including the respective information of "battery voltage", "battery full charge voltage", "battery remaining capacity level" and "power transmission/reception request power" to/from the power transmission apparatus 100 during the communication time according to the "power feeding and communication time" information of the apparatus status information.

At S567, the Rx control unit 202 transitions to the WPT state (FIG. 4) as illustrated in FIG. 8(A) and FIG. 8(B) during a time (0.5 seconds in FIG. 6) defined by the "blank time" information of the apparatus status information. For making a transition to the WPT state, the Rx control unit 202 controls the resonance frequency switching circuits 208 and 222 to switch the resonance frequency of the Rx power receiving antenna 204 to f0 (=13.56 MHz) and the resonance frequency of the Rx communication antenna 218 to f1 (=4 MHz). When making a transition from the WPT state to the COMM state during the standby time (0.5 seconds), the Rx control unit 202 first switches the resonance frequency of the Rx communication antenna 218 to f0 and then switches the resonance frequency of the Rx power receiving antenna 204 to f1. Thus, by first tuning the resonance frequency of the Rx power receiving antenna 204 with the backup power and the carrier power of the close proximity wireless communication, the backup power and the carrier power of the close proximity wireless communication can be continuously supplied to the Rx control unit 202.

At S567, the Rx control unit 202 returns to S562 after the transition to the WPT state.

Hereinafter, the Rx control unit 202 time-divisionally executes wireless power feeding and communication in repetition according to the "power feeding and communication time" information and the "blank time" information of the apparatus status information until it is determined at S565 that the rechargeable battery 216 is fully charged. In the above-described example, the sequence is repeated with six seconds of wireless power feeding, 0.5 seconds of a blank, one second of communication, and 0.5 seconds of a blank as a unit.

In Example 1, before the start of the wireless power transmission, relative to the backup power carrier frequency, both the Rx power receiving antenna 204 and the Rx communication antenna 218 of the power receiving apparatus 200 are brought into the non-resonance state to detect presence/absence of another device, such as a contactless IC card. When another device, such as a contactless IC card, is present nearby, this enables protection from such an effect as heat generation caused by wireless power feeding.

Additionally, since during the close proximity wireless communication, with the carrier signal frequency, the Rx power receiving antenna fails to resonate and only the close proximity wireless communication antenna resonates, a loss of carrier power in the close proximity wireless communication can be reduced to prevent a reduction in a close proximity wireless communication distance.

Since during the wireless power transmission, with the power carrier frequency, the Rx power receiving antenna resonates, but the close proximity wireless communication antenna fails to resonate, the close proximity wireless communication antenna will not supply an excess voltage or the like to a subsequent-stage circuit. This protects a subsequent-stage circuit of the close proximity wireless communication antenna from such an effect as heat generation and the like.

Since wireless power transmission from the power transmission apparatus 100 to the power receiving apparatus 200 and wireless communication for controlling this wireless power transmission are time-divisionally executed in the same carrier frequency band, the power transmission apparatus 100 can use the Tx power transmission antenna 110 also as a communication antenna for wireless communication.

Example 2

Figure 9:
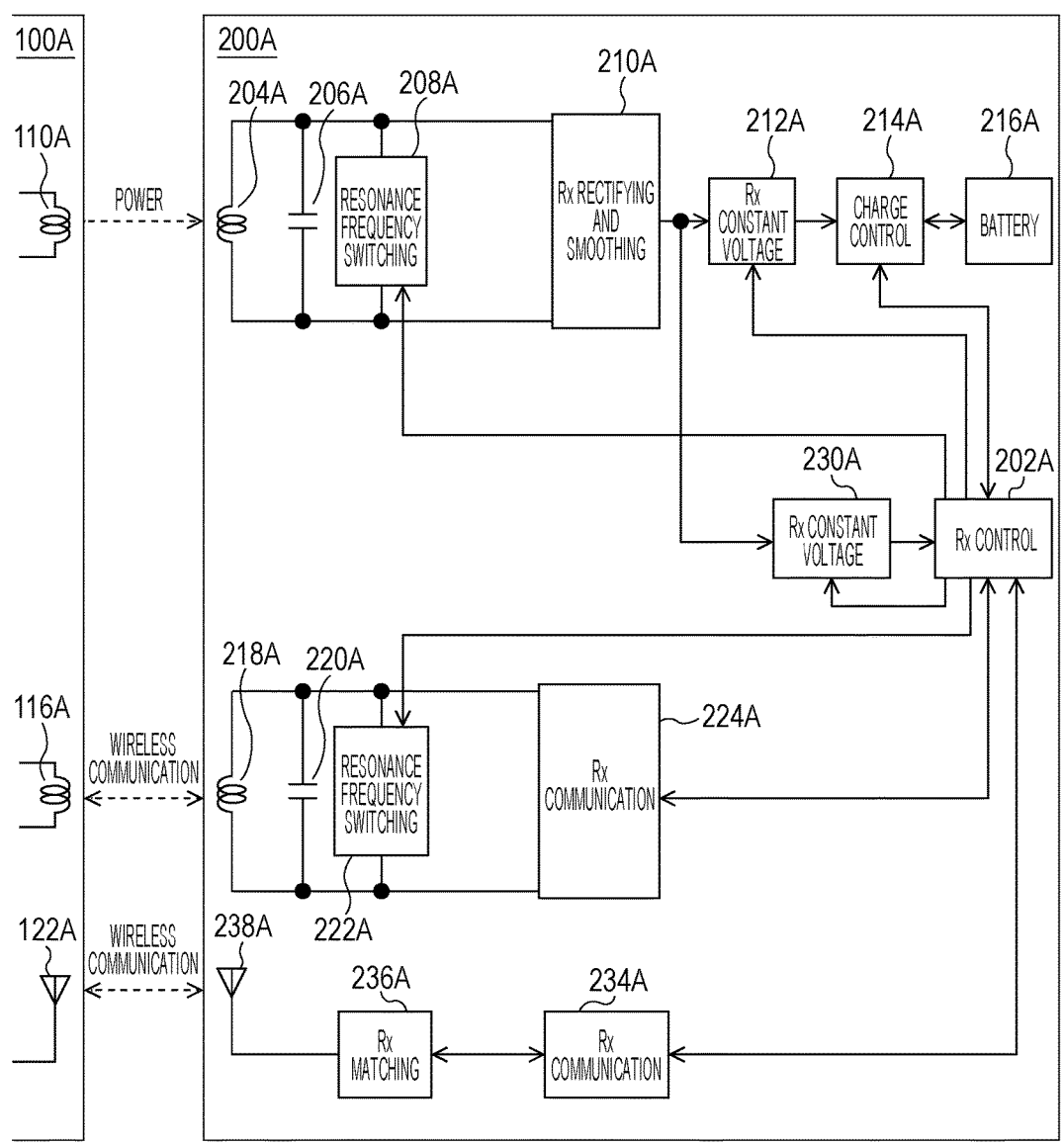
FIG. 9 is a block diagram illustrating a schematic configuration of a power receiving apparatus of an Example 2.

A description will be made of an Example 2 applied to a wireless power transmission system in which wireless communication and wireless power transmission are conducted at different carrier frequencies between the power transmission apparatus and the power receiving apparatus. FIG. 9 is a block diagram illustrating a schematic configuration of a power receiving apparatus 200A of the Example 2. Reference codes obtained by adding a letter "A" subsequent to the reference codes of the components in the power receiving apparatus 200 are assigned to the corresponding components of the power receiving apparatus 200A illustrated in FIG. 9. A power transmission apparatus 100A corresponding to the power receiving apparatus 200A has the same configuration and function as those of the power transmission apparatus 100 in the Example 1, except that wireless communication and wireless power transmission are conducted at different carrier frequencies and except for control accompanying therewith. In the following description, a configuration and a function of the power transmission apparatus 100A will be described, in which reference codes obtained by adding "A" to the end of the reference codes of the components in the power transmission apparatus 100 are assigned to the corresponding components of the power transmission apparatus 100A.

In the power receiving apparatus 200, the diodes 232 and 228 are wired-OR connected to an input of the Rx constant voltage circuit 230 such that the Rx constant voltage circuit 230 receives currents from both the Rx rectifying and smoothing circuits 210 and 226. By contrast, in the power receiving apparatus 200A, the Rx rectifying and smoothing circuit 226 and the diodes 228 and 232 are omitted. In other words, to an input of a Rx constant voltage circuit 230A, an output voltage of a Rx rectifying and smoothing circuit 210A is directly supplied.

Additionally, while in the Example 1, the Rx communication unit 224 communicates the apparatus status information (control data of the wireless power transmission) with the power transmission apparatus 100, the Rx communication unit 234 does not communicate the apparatus status information with the power transmission apparatus 100. By contrast, in the Example 2, a Rx communication unit 224A does not communicate the apparatus status information with the power transmission apparatus 100A, and a Rx communication unit 234A communicates the apparatus status information with the power transmission apparatus 100A by short-distance wireless communication.

A resonance frequency of a Rx power receiving antenna 204A is assumed to be set in the vicinity of 20 MHz in a HF band when a resonance frequency switching circuit 208A is non-conductive. Additionally, a resonance frequency of a Rx communication antenna 218A is assumed to be set in the vicinity of 13.56 MHz in a HF band when the antenna resonance frequency switching circuit 222 is non-conductive.

FIG. 10 illustrates examples of the resonance frequencies of the Rx power receiving antenna 204A and the Rx communication antenna 218A in each state of the power receiving apparatus 200A. Numerical values indicated in the table illustrated in FIG. 10 as the resonance frequencies of the Rx power receiving antenna 204A and the Rx communication antenna 218A are for explanation purposes only, and the aspects of the present invention are not limited to these numerical values. The power receiving apparatus 200A also has the COMM state, the WPT state, the SUSP state and the BLNK state.

In the COMM state, the resonance frequency of the Rx power receiving antenna 204A is represented as f2 and the resonance frequency of the Rx communication antenna 218A as f0. The resonance frequency of the Rx power receiving antenna 204A is set to be a frequency higher or lower than a carrier frequency of close proximity wireless communication so as not to resonate with the carrier frequency of the close proximity wireless communication. The resonance frequency of the Rx communication antenna 218A is set to be in the vicinity of the carrier frequency of the close proximity wireless communication so as to resonate with the carrier frequency of the close proximity wireless communication, thereby enabling communication. The COMM state is an initial state before a start or after an end of a power feeding sequence for executing wireless power transmission between the power transmission apparatus 100A and the power receiving apparatus 200A. When the resonance frequency switching circuits 208A and 222A have the circuit configuration as illustrated in FIG. 3A, in the COMM state, the switch 304 is off.

In the WPT state, the resonance frequency of the Rx power receiving antenna 204A is represented as f2, and the resonance frequency of the Rx communication antenna 218A as f1. The resonance frequency of the Rx power receiving antenna 204A is set to be a frequency in the vicinity of the carrier frequency of the wireless power transmission so as to resonate with the carrier frequency of the wireless power transmission, thereby receiving power. The resonance frequency of the Rx communication antenna 218A is set to be a frequency lower than the carrier frequency of the wireless power transmission so as not to resonate with the carrier frequency of the wireless power transmission and so as not to tune with a harmonic of the carrier frequency of the wireless power transmission. When the resonance frequency switching circuits 208A and 222A have the circuit configuration as illustrated in FIG. 3A, in the WPT state, the switch 304 of the resonance frequency switching circuit 208A is off, and the switch 304 of the resonance frequency switching circuit 222A is on.

In the SUSP state, the resonance frequency of the Rx power receiving antenna 204A and the resonance frequency of the Rx communication antenna 218A are both represented as f1. The resonance frequencies of the Rx power receiving antenna 204A and the Rx communication antenna 218A are set to be a frequency higher or lower than any of the carrier frequency of the close proximity wireless communication and the carrier frequency of the wireless power transmission so as not to resonate with any of these carrier frequencies. The apparatus 200A enters the SUSP state before the start of the power feeding sequence for executing wireless power transmission between the power transmission apparatus 100A and the power receiving apparatus 200A. Additionally, the apparatus 200A enters the SUSP state also when after the start of the power feeding sequence, the power feeding sequence is temporarily stopped for detecting a contactless IC card as other device. When the resonance frequency switching circuits 208A and 222A are configured with the circuit as illustrated in FIG. 3A, in the SUSP state, both the switches 304 of the resonance frequency switching circuits 208A and 222A are on.

In the BLNK state, the resonance frequency of the Rx communication antenna 218A has the same value as that in the indefinite state during switching or in the COMM state.

Figure 11A:
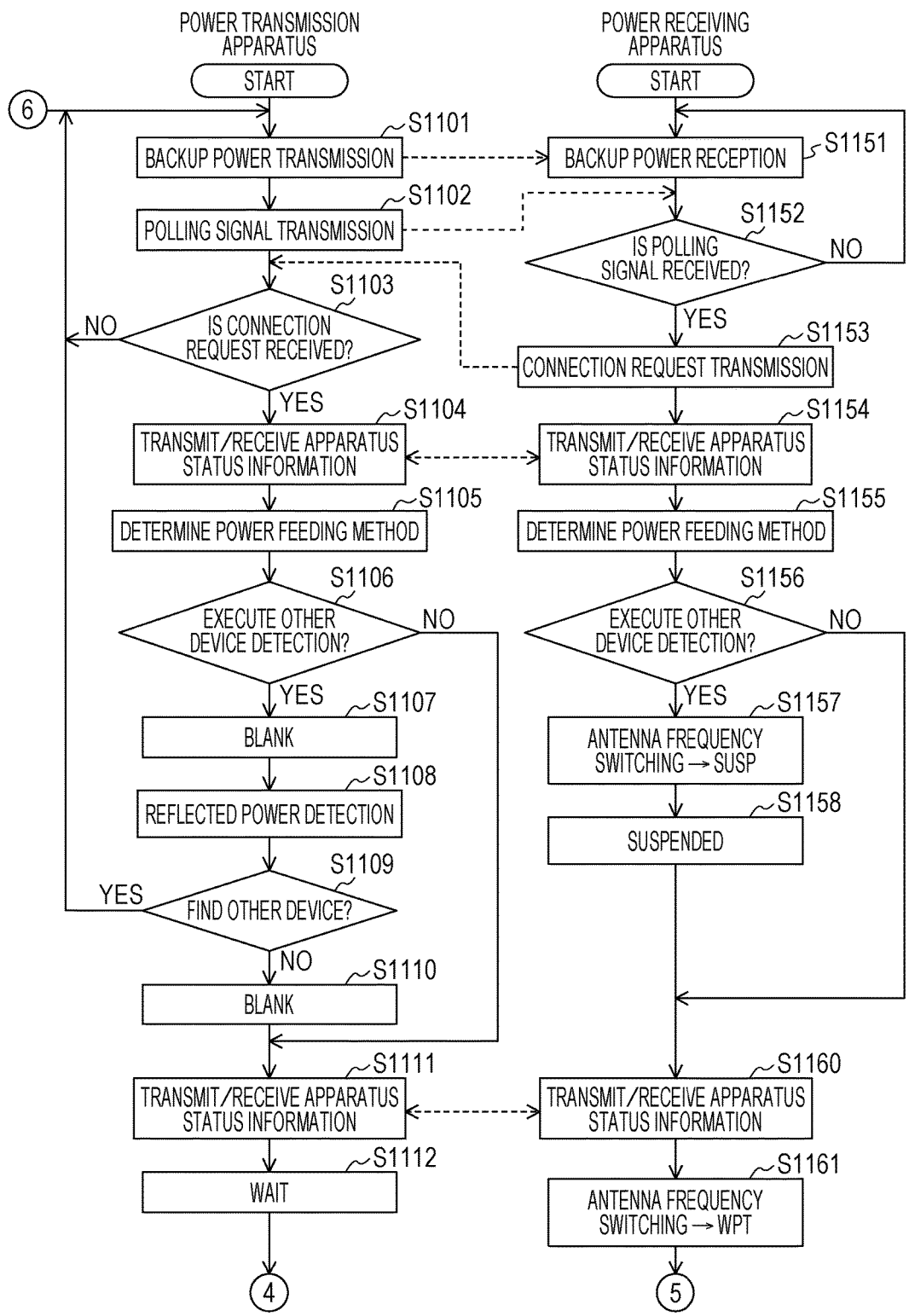
FIG. 11A is a flow chart illustrating a procedure of wireless power transmission of the Example 2.
Figure 11B:
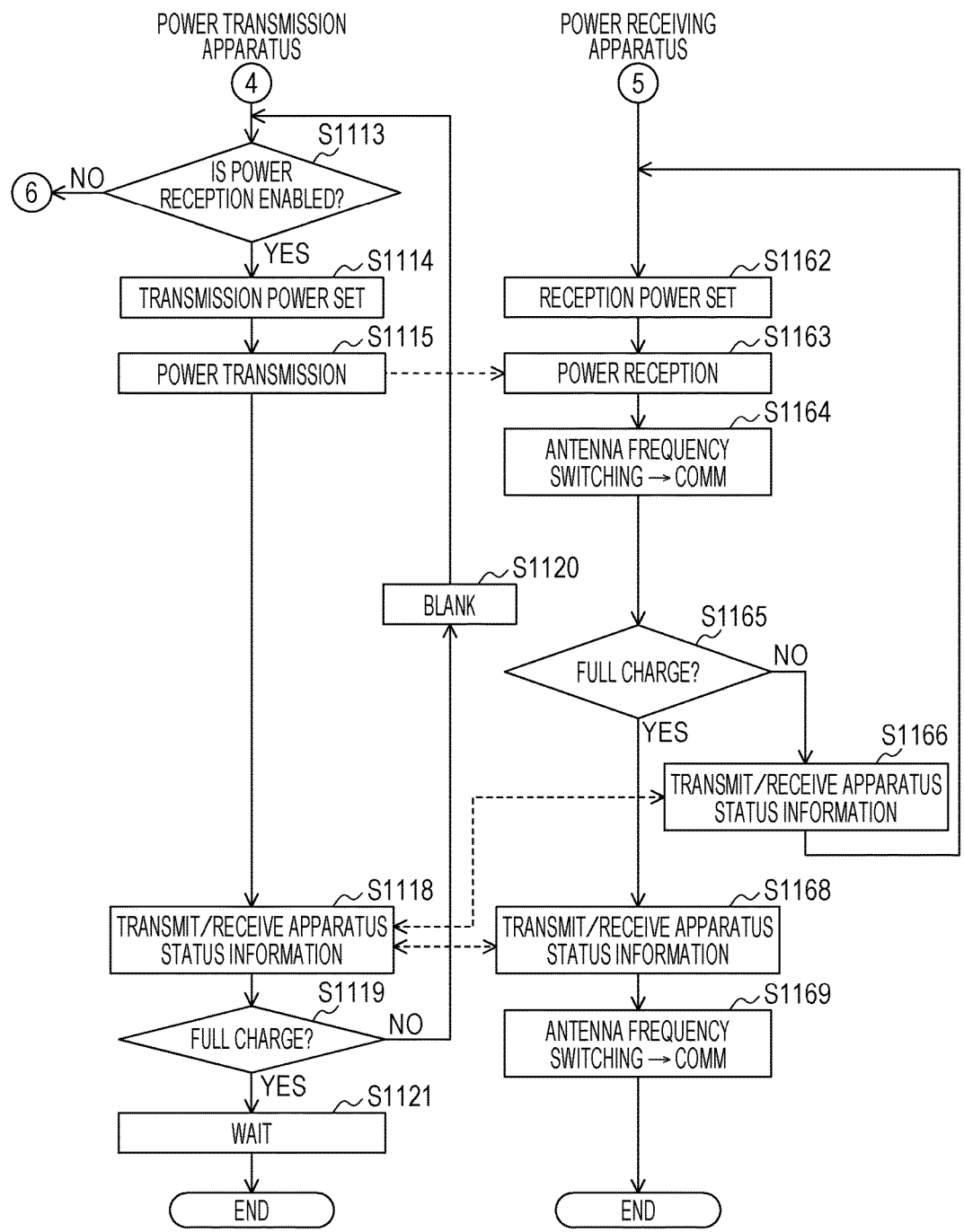
FIG. 11B is a flow chart subsequent to FIG. 11A.

FIG. 11A and FIG. 11B are flow charts illustrating a procedure of wireless power transmission from the power transmission apparatus 100A to the power receiving apparatus 200A. Unless otherwise noted, processing of the power transmission apparatus 100A is executed by a Tx control unit (not illustrated) corresponding to the Tx control unit 102 and processing of the power receiving apparatus 200A is executed by the Rx control unit 202A. Communication of control data (apparatus status information) for controlling power transmission between the power transmission apparatus 100A and the power receiving apparatus 200A is conducted between a Tx communication unit corresponding to the Tx communication unit 118 and a Rx communication unit 234B.

In FIG. 11A and FIG. 11B, steps at which the same processing as that of the flow charts illustrated in FIG. 5A and FIG. 5B is executed are allotted the same reference codes. No detailed description will be made of these steps.

FIG. 12 illustrates examples of a configuration and contents of control data (apparatus status information) transmitted and received between the power transmission apparatus 100A and the power receiving apparatus 200A in the flow charts illustrated in FIG. 11A and FIG. 11B. The power transmission apparatus 100A stores apparatus status information in the Tx control unit corresponding to the Tx control unit 102, and the power receiving apparatus 200A stores the apparatus status information in the Rx control unit 202A.

As an example for explanation, the power transmission apparatus 100A and the power receiving apparatus 200A can have the arrangement illustrated in FIG. 7A and FIG. 7B similarly to the power transmission apparatus 100 and the power receiving apparatus 200. The reference codes "100" and "200" in FIG. 7A and FIG. 7B are read as "100A" and "200A", respectively, and the other elements are read in the same manner.

FIG. 13 illustrates a timing chart of the example of the power transmission control sequence illustrated in FIG. 11A and FIG. 11B. FIG. 13(A) illustrates an example of a resonance frequency change of the Rx power receiving antenna 204A. FIG. 13(B) illustrates an example of a resonance frequency change of the Rx communication antenna 218A. FIG. 13(C) illustrates an example of a change in transmission power of an HF band output from the power transmission apparatus 100A. FIG. 13(D) illustrates an example of a change in a communication state of power feeding control and in a carrier frequency for use herein.

Operation of the power transmission apparatus 100A will be described with reference to FIG. 11A, FIG. 11B, FIG. 13(C), and FIG. 13(D).

At S1101, the power transmission apparatus 100A controls a Tx power transmission unit corresponding to the Tx power transmission unit 104 to transmit backup power. A frequency of the backup power is set to be 6.78 MHz in a HF band and transmission power is set to have an arbitrary value of 0.25 W, for example, when converted into 13.56 MHz of the same HF band. The power of the backup power transmission can have a magnetic field intensity equivalent to 6.0 A/m at 13.56 MHz at an interface between an inner part and an outer part of the power transmission apparatus 100A. The power of the backup power transmission preferably has a value less than a magnetic field intensity allowed for the contactless IC card 300 or less than power of an aerial wire.

At S1102, the power transmission apparatus 100A externally transmits a polling signal through short-distance wireless communication of the Tx communication unit corresponding to the Tx communication unit 118 and at S1103, determines whether a connection request response from the power receiving apparatus (the power receiving apparatus 200A here) is present. In the short-distance wireless communication used in S1102, it is assumed that as an example, packets are transmitted in an advertise mode of Bluetooth® Low Energy. Since the protocol of Bluetooth® Low Energy is a common method, no description will be made thereof. Thus, transmitting a polling signal by the power transmission apparatus 100A and responding to the polling signal by the power receiving apparatus 200A results in that the power transmission apparatus 100A finds the power receiving apparatus 200A to start communication with the power receiving apparatus 200A by the short-distance wireless communication At S1103, the power transmission apparatus 100A determines whether a connection request response from the power receiving apparatus 200A is present. When receiving no connection request response from the power receiving apparatus 200A (S1103), the power transmission apparatus 100A returns to S1101 to execute backup power transmission. When determining that a connection request from the power receiving apparatus 200A is present (S1103), the power transmission apparatus 100A transmits/receives the apparatus status information to/from the power receiving apparatus 200A at S1104. Specifically, the respective information of "power feeding method", "coping with other device detection", "power reception enabled/disabled", "maximum received power", "power transmission/reception request power" and "blank time" of the apparatus status information are transmitted and/or received.

At S1105, the power transmission apparatus 100A determines a power feeding method for the power receiving apparatus 200A according to "power feeding method" of the apparatus status information received at S1104. Here, power is wirelessly transmitted centered around the power frequency f2=13.56 MHz, and communication of the power feeding control data (apparatus status information) is conducted in a 2.45 GHz band outside the frequency band of power feeding. In Example 2, since the wireless power transmission and the wireless communication of control data are conducted in different frequency bands, the wireless power transmission and the wireless communication of control data can be executed simultaneously in parallel to each other.

At S1106, the power transmission apparatus 100A determines whether to execute other device detection in synchronization with the power receiving apparatus 200A according to "coping with other device detection" of the apparatus status information received at S1104. "Other device" in other device detection indicates, for example, other power receiving apparatuses than the power receiving apparatus 200A as a wireless power feeding target, such as the contactless IC card 300.

At S1101 to S1106, the power transmission apparatus 100A and the power receiving apparatus 200A are in the COMM state (FIG. 10) as illustrated in FIG. 13(C). The power transmission apparatus 100A determines that the power receiving apparatus 200A can cope with other device detection when "coping with other device detection" is "enabled" (S1106), and determines that the power receiving apparatus 200A cannot cope with other device detection when the same is "disabled" (S1106). When "coping with other device detection" of the power receiving apparatus 200A is disabled, S1107 through S1110 are skipped to proceed to S1111.

When "coping with other device detection" of the power receiving apparatus 200A is "enabled" (S1106), the power transmission apparatus 100A waits for a time set by "blank time" of the apparatus status information (0.5 seconds in FIG. 12) at S1107. At S1107, the power transmission apparatus 100A and the power receiving apparatus 200A are in the BLNK state (FIG. 10) as illustrated in FIG. 13(C). At S1108, the power transmission apparatus 100A controls the Tx power transmission unit corresponding to the Tx power transmission unit 104 to transmit power equivalent to the backup power. Simultaneously, the power transmission apparatus 100A detects a traveling wave voltage VF and a reflected wave voltage VR of power output from the Tx power transmission antenna 110A in a reflected power detection circuit corresponding to the reflected power detection circuit 106. At S1108, the power transmission apparatus 100A and the power receiving apparatus 200A are in the SUSP state (FIG. 10) as illustrated in FIG. 13(C). The power transmission apparatus 100A calculates, for example, a standing wave ratio VSWR, based on the traveling wave voltage VF and the reflected wave voltage VR detected at S1108.

At S1109, the power transmission apparatus 100A compares the standing wave ratio VSWR with a threshold value thereof to determine whether other device is present in the vicinity of the Tx power transmission antenna 110A or not. When the power transmission apparatus 100A transmits power equivalent to the backup power, if another device that absorbs power of a HF band is present in the vicinity of the Tx power transmission antenna 110A, VSWR is reduced in general. Here, VSWR is assumed to be less than or equal to 3 for the purpose of description. On the other hand, when the power transmission apparatus 100A transmits the power equivalent to the backup power, if another device that absorbs power of a HF band is not present in the vicinity of the Tx power transmission antenna 110A, VSWR is increased in general. Here, VSWR is assumed to be greater than or equal to 6 for the purpose of description. Accordingly, the power transmission apparatus 100A can determine presence/absence of another device by setting the threshold value of the standing wave ratio VSWR to be 4, for example.

When determining that another device is present (S1109), the power transmission apparatus 100A returns to S1101 to execute backup power transmission again. When determining that no other device is present (S1109), the power transmission apparatus 100A waits for the time set by "blank time" (0.5 seconds in FIG. 12) at S1110. At S1110, the power transmission apparatus 100A and power receiving apparatus 200A are in the BLNK state (FIG. 10) as illustrated in FIG. 13(C).

At S1111, the power transmission apparatus 100A transmits/receives the apparatus status information including the respective information of "power reception enabled/disabled" and "power feeding sequence waiting time" to/from the power receiving apparatus 200A. At S1111, the power transmission apparatus 100A and power receiving apparatus 200A are in the COMM state (FIG. 10) as illustrated in FIG. 13(C).

At S1112, the power transmission apparatus 100A waits for a time (one second in FIG. 12) set by "power feeding sequence waiting time" of the apparatus status information. At S1112, the power transmission apparatus 100A and power receiving apparatus 200A are in the BLNK state (FIG. 10) as illustrated in FIG. 13(C).

At S1113, the power transmission apparatus 100A determines whether the power receiving apparatus 200A is in a state that enables reception of wireless power based on the "power reception enabled/disabled" information of the apparatus status information received at S1111. When the power receiving apparatus 200A is not in the state enabling reception of wireless power (S1113), the power transmission apparatus 100A returns to S1101 to execute backup power transmission. When the power receiving apparatus 200A is in the state enabling reception of wireless power (S1113), the power transmission apparatus 100A proceeds to S1114.

At S1114, according to the respective information, "maximum received power" and "power transmission/reception request power" of the apparatus status information transmitted or received at S1104, the power transmission apparatus 100A sets power transmission/reception set power without exceeding a range of the "maximum received power". In the example as illustrated in FIG. 12, the power transmission/reception set power to be set at S1114 is 2.8 W according to the information of "power transmission/reception request power" transmitted from the power receiving apparatus 200A. Additionally, at S1115, the power transmission apparatus 100A controls the Tx power transmission unit corresponding to the Tx power transmission unit 104 to feed power to the power receiving apparatus 200A wirelessly. At S1115, the power transmission apparatus 100A and power receiving apparatus 200A are in the WPT state (FIG. 10) as illustrated in FIG. 13(C). In the Example 2, since the wireless communication and the wireless power transmission are conducted at different carrier frequencies, the wireless communication and the wireless power transmission can be simultaneously executed in parallel to each other. At S1115, the power transmission apparatus 100A sets a Tx matching circuit corresponding to the Tx matching circuit 108 to an impedance matching state appropriate for wireless power transmission. Although at the time of feeding power to the power receiving apparatus 200A, the power transmission apparatus 100A sets the Tx matching circuit corresponding to the Tx matching circuit 108 to an impedance matching state appropriate for wireless power transmission, no description will be made thereof.

At S1118, the power transmission apparatus 100A transmits/receives the apparatus status information including the respective information of "power reception enabled/disabled", "battery voltage", "battery full charge voltage", "battery remaining capacity level" and "power transmission/reception request power" to/from the power receiving apparatus 200A. At S1118, the power transmission apparatus 100A and the power receiving apparatus 200A are in the COMM state (FIG. 10) as illustrated in FIG. 13(C).

At S1119, the power transmission apparatus 100A determines whether a rechargeable battery 216A of the power receiving apparatus 200A is in a full charge state according to "battery voltage" and "battery full charge voltage", or "battery remaining capacity level" of the apparatus status information received at S1118. When the rechargeable battery 216A of the power receiving apparatus 200A is not in the full charge state (S1119), the power transmission apparatus 100A returns to S1113. At S1119, the power transmission apparatus 100A and power receiving apparatus 200A are in the BLNK state (FIG. 10) as illustrated in FIG. 13(C).

When the rechargeable battery 216A of the power receiving apparatus 200A is in the full charge state (S1119), the power transmission apparatus 100A waits for a time (one second in FIG. 12) set by the "power feeding sequence waiting time" information of the apparatus status information at S1121 to end the flows illustrated in FIG. 11A and FIG. 11B. At S1121, the power transmission apparatus 100A and the power receiving apparatus 200A are in the BLNK state (FIG. 10) as illustrated in FIG. 13(C).

Operation of the power receiving apparatus 200A will be described with reference to FIG. 11A, FIG. 11B, FIG. 13(A), and FIG. 13(B). In the initial state, the power receiving apparatus 200A is in the COMM state (FIG. 10) as illustrated in FIG. 13(A) and FIG. 13(B) (which state is assumed here to be the initial state of the power receiving apparatus 200A). In the COMM state, the resonance frequency of the Rx power receiving antenna 204A is represented as f2 (=6.78 MHz) and the resonance frequency of the Rx communication antenna 218A as f0 (=13.56 MHz).

At S1151, the power receiving apparatus 200A receives backup power transmitted from the power transmission apparatus 100A to operate. The frequency of the backup power electromagnetically radiated from the power transmission apparatus 100A is 6.78 MHz as described above. Additionally, the resonance frequency of the Rx power receiving antenna 204A is represented as f2 (=6.78 MHz) and the resonance frequency of the Rx communication antenna 218A as f0 (=13.56 MHz). Accordingly, while the Rx power receiving antenna 204A resonates with the electromagnetic waves of the backup power and receives the backup power, the Rx communication antenna 218A does not resonate with the electromagnetic waves of the backup power and substantially receives no backup power. The Rx rectifying and smoothing circuit 210A rectifies and smooths a current from the Rx power receiving antenna 204A, and the Rx constant voltage circuit 230A supplies the Rx control unit 202A and other units with a defined power source voltage. As a result, even when the rechargeable battery 216A fails to have sufficient power, the power receiving apparatus 200A can conduct minimum operation with the backup power from the power transmission apparatus 100A. The operation will be described below.

At S1152, the Rx control unit 202A determines whether the Rx communication unit 224A receives a polling signal of short-distance wireless communication from the power transmission apparatus 100A or not. While receiving no polling signal, the power receiving apparatus 200A receives the backup power from the power transmission apparatus 100A at S1151. When receiving the polling signal (S1152), the Rx control unit 202A transmits a connection request at S1153. The power receiving apparatus 200A transmits the connection request to the power transmission apparatus 100A as a response to an advertise packet in, for example, an initiating mode of Bluetooth® Low Energy.

At S1152, the power receiving apparatus 200A is in the COMM state (FIG. 12). In the COMM state, since with the carrier frequency of 13.56 MHz of the communication polling signal, the Rx power receiving antenna 204A does not resonate, the antenna does not substantially receive the communication polling signal and carrier power thereof. However, the Rx communication antenna 218A resonates to receive the communication polling signal and the carrier power thereof. In other words, in the COMM state, a loss of carrier signal power caused by the Rx rectifying and smoothing circuit 210A can be reduced, resulting in maximizing a supply of carrier signal power of short-distance wireless communication from the Rx communication antenna 218A to the Rx communication unit 224A. As a result, a decrease in a communication distance of the Rx communication unit 224A can be prevented, thereby enabling short-distance wireless communication with the power transmission apparatus 100A.

The power transmission apparatus 100A having received the connection request from the power receiving apparatus 200A executes connection processing with the power receiving apparatus 200A. When the processing of S1105 in the power transmission apparatus 100A and the processing of S1153 in the power receiving apparatus 200A are completed, the power transmission apparatus 100A and the power receiving apparatus 200A enter a connection mode.

At S1154, the Rx control unit 202A transmits/receives the apparatus status information to/from the power transmission apparatus 100A through short-distance wireless communication. The information transmitted/received here includes the respective information of "power feeding method", "coping with other device detection", "power reception enabled/disabled", "maximum received power", "power transmission/reception request power" and "blank time".

At S1155, the Rx control unit 202A determines a power feeding method for the wireless power transmission from the power transmission apparatus 100A according to the "power feeding method" information of the apparatus status information received at S1154.

At S1156, the Rx control unit 202A determines whether to execute other device detection in synchronization with the power receiving apparatus 200A according to the "coping with other device detection" information of the apparatus status information received at S1154. When the "coping with other device detection" information is "disabled", the power transmission apparatus 100A cannot cope with the other device detection. In this case, the Rx control unit 202A skips S1157 and S1158 to proceed to S1160.

When the "coping with other device detection" information of the apparatus status information received at S1154 is "enabled" (S1156), the power transmission apparatus 100A can cope with the other device detection. In this case, the Rx control unit 202A transitions to the SUSP state (FIG. 10) as illustrated in FIG. 13(A) and FIG. 13(B) for a time period (0.5 seconds in FIG. 12) as defined by the "blank time" information of the apparatus status information at S1157. For making a transition to the SUSP state, the Rx control unit 202A controls the resonance frequency switching circuits 208A and 222A to switch both the resonance frequency of the Rx power receiving antenna 204A and the resonance frequency of the Rx communication antenna 218A to f1 (=4 MHz).

At S1158 subsequent to S1157, the Rx control unit 202A maintains the SUSP state for one second. The SUSP state maintaining time can be a predetermined time or a time defined by the "power feeding sequence waiting time" information of the apparatus status information received at S1154.

Power for controlling the resonance frequency switching circuits 208A and 222A required for maintaining the SUSP state can be covered by accumulating a part of the backup power received before a transition to the SUSP state. When accumulating a part of the backup power received before a transition to the SUSP state, power can be accumulated, for example, in any of an input capacitor and an output capacitor of the Rx constant voltage circuit 230A and an input capacitor of the Rx control unit 202A.

At S1158, the carrier frequency of the backup power received by the power receiving apparatus 200A is 6.78 MHz. Since the Rx power receiving antenna 204A in the SUSP state does not resonate with the carrier frequency of the backup power, the antenna does not substantially receive the backup power. Additionally, since in the SUSP state, the Rx communication antenna 218 does not resonate either, the antenna does not substantially receive the backup power. In other words, in the SUSP state (S1158), all the antennas configuring the power receiving apparatus 200A enter a state of non-resonance with the backup power from the power transmission apparatus 100A.

At S1158, while the power receiving apparatus 200A maintains the SUSP state for one second, the power transmission apparatus 100A detects the traveling wave voltage VF and the reflected wave voltage VR at S1108 to determine whether another device is present at S1109. As illustrated in FIG. 7A, when no device other than the power transmission apparatus 100A and the power receiving apparatus 200A is present, the power receiving apparatus 200A maintains the SUSP state, so that the power transmission apparatus 100A can determine that no other device resonating with the power frequency is present. As illustrated in FIG. 7B, when the contactless IC card 300 is located nearby, the power transmission apparatus 100A can recognize the contactless IC card 300 as another device resonating with the power frequency. Also when other power receiving apparatus in a state of resonation with the power frequency, for example, another power receiving apparatus not in the SUSP state, is present nearby, the power transmission apparatus 100A can recognize the power receiving apparatus as another device as a matter of course.

At S1160, the Rx control unit 202A transmits/receives the apparatus status information including the respective information of "power reception enabled/disabled" and "power feeding sequence waiting time" to/from the power transmission apparatus 100A.

At S1161, the Rx control unit 202A transitions to the WPT state (FIG. 10) as illustrated in FIG. 13(A) and FIG. 13(B) during a time defined by the "blank time" information of the apparatus status information and a time defined by the "power feeding sequence waiting time" information. In the example illustrated in FIG. 12, the time defined by the "blank time" information is 0.5 seconds and the time defined by the "power feeding sequence waiting time" information is one second.

After the transition to the WPT state at S1161, the power receiving apparatus 200A and the power transmission apparatus 100A continue the WPT state until the power feeding sequence ends and simultaneously execute the wireless power transmission and controlling wireless communication in parallel to each other.

For making a transition to the WPT state, the Rx control unit 202A controls the resonance frequency switching circuits 208A and 222A to switch the resonance frequency of the Rx power receiving antenna 204A to f2 (=6.78 MHz) and the resonance frequency of the Rx communication antenna 218A to f1 (=4 MHz).

At S1162, the Rx control unit 202A controls the charge control circuit 214A according to the "power transmission/reception request power" information of the apparatus status information to set a charge condition of the rechargeable battery 216A so as to be optimum for the "power transmission/reception request power" information. When the processing of S1114 in the power transmission apparatus 100A and the processing of S1162 in the power receiving apparatus 200A are completed, wireless power feeding is enabled between the power transmission apparatus 100A and the power receiving apparatus 200A.

Since the frequency of the power received at S1162 is 6.78 MHz, the Rx power receiving antenna 204A resonates to receive the power, and the Rx communication antenna 218A does not resonate and substantially receives no power. While the power receiving apparatus 200A is in the WPT state to receive the power, the Rx communication antenna 218A does not resonate with the power wave from the power transmission apparatus 100A and therefore fails to supply excess power to the Rx communication unit 224A at a subsequent stage. This enables the Rx communication unit 224A to be protected from such an effect as heat generation.

At S1165, the Rx control unit 202A determines whether the rechargeable battery 216A is in a full charge state. When determining that the rechargeable battery 216A is in the full charge state (S1165), the Rx control unit 202A sets the "power reception enabled/disabled" information of the apparatus status information to "disabled" in order to notify the power transmission apparatus 100 that the rechargeable battery 216A is in the full charge state at S1168. Then, the Rx control unit 202A transmits/receives the apparatus status information including the respective information of "power reception enabled/disabled", "battery voltage", "battery full charge voltage" and "battery remaining capacity level" to/from the power transmission apparatus 100A. This enables the power transmission apparatus 100A to find that the rechargeable battery 216A of the power receiving apparatus 200A is fully charged.

At S1169 subsequent to S1168, the Rx control unit 202A returns to the initial state, i.e. the COMM state (FIG. 10) as illustrated in FIG. 13(A) and FIG. 13(B) during a communication time (one second) defined by the "power feeding sequence waiting time" information of the apparatus status information. The Rx control unit 202A controls the resonance frequency switching circuits 208A and 222A to switch the resonance frequency of the Rx power receiving antenna 204A to f2 (=6.78 MHz) and the resonance frequency of the Rx communication antenna 218A to f0 (=13.56 MHz).

When determining that the rechargeable battery 216A is not in the full charge state (S1165), the Rx control unit 202A obtains a latest charge state of the rechargeable battery 216A, calculates power required for charging the rechargeable battery 216A, and sets the calculated power to the "power transmission/reception request power" information. At 51166, the Rx control unit 202A transmits/receives the apparatus status information including the respective information of "battery voltage", "battery full charge voltage", "battery remaining capacity level" and "power transmission/reception request power" to/from the power transmission apparatus 100A and returns to S1162.

Hereinafter, the Rx control unit 202A simultaneously executes wireless power transmission and controlling wireless communication in parallel to each other and in repetition until it is determined at S1165 that the rechargeable battery 216A is fully charged.

In the Example 2, before the start of the wireless power transmission, relative to the backup power carrier frequency, both the Rx power receiving antenna 204A and Rx communication antenna 218A are brought into the non-resonance state to detect presence/absence of another device such as the contactless IC card. When another device such as a contactless IC card is present nearby, this enables protection from such an effect as heat generation caused by wireless power feeding.

Additionally, since during the short-distance wireless communication, with the carrier signal frequency, the Rx power receiving antenna fails to resonate and only the close proximity wireless communication antenna resonates, a loss of carrier power in the close proximity wireless communication can be reduced to prevent a reduction in a close proximity wireless communication distance.

Since, during the wireless power transmission, with the power carrier frequency, the Rx power receiving antenna resonates, but the close proximity wireless communication antenna fails to resonate, the close proximity wireless communication antenna will not supply an excess voltage or the like to a subsequent-stage circuit. This protects a subsequent-stage circuit of the close proximity wireless communication antenna from such an effect as heat generation.

Example 3

A description will now be made of an Example 3 in which a subsequent-stage circuit of a communication antenna can be protected irrespective of whether carrier frequencies of wireless communication and wireless power transmission conducted between a power transmission apparatus and a power receiving apparatus are the same.

Figure 14:
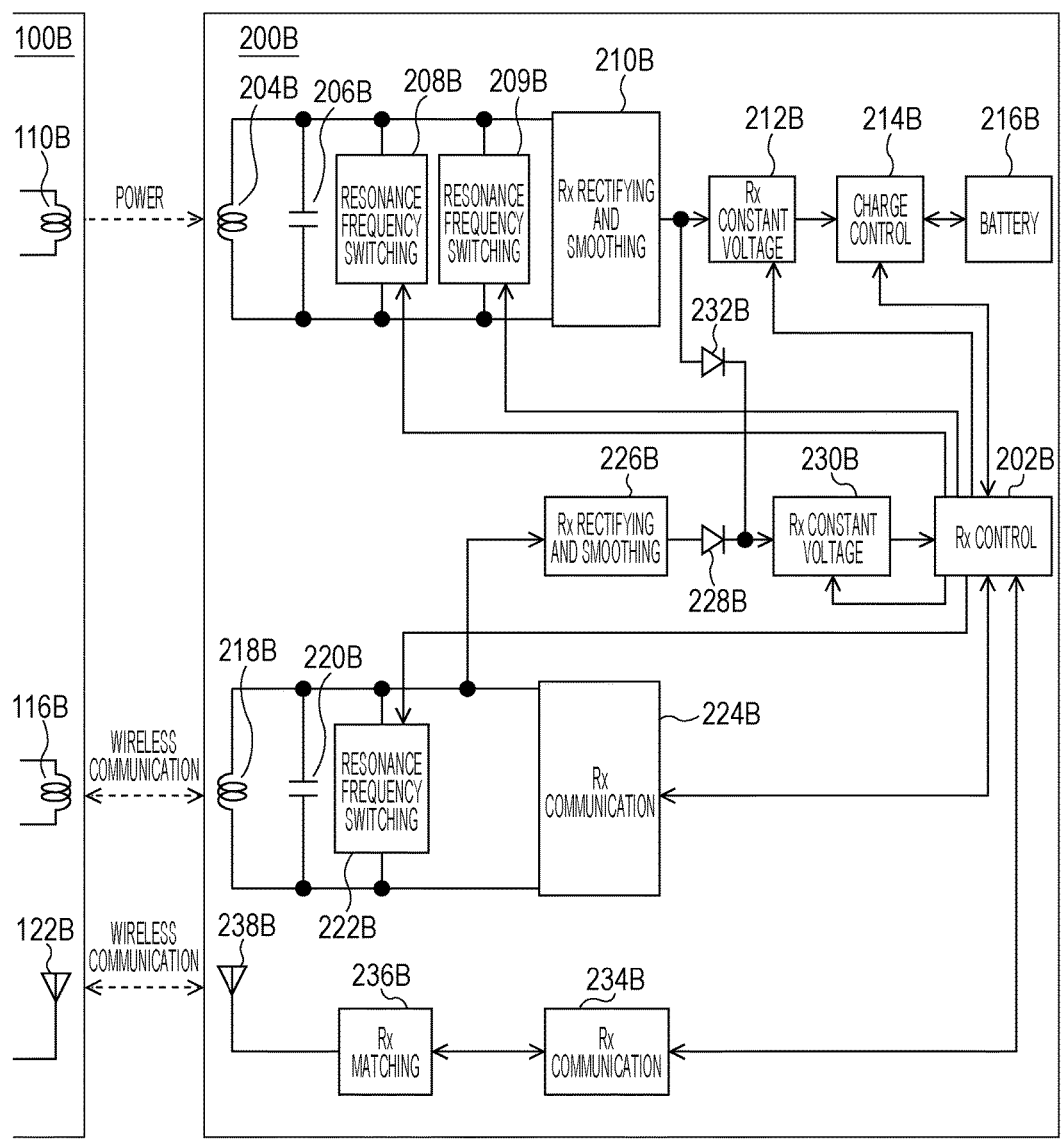
FIG. 14 is a block diagram illustrating a schematic configuration of a power receiving apparatus in an Example 3.

FIG. 14 is a block diagram illustrating a schematic configuration of a power receiving apparatus 200B in the Example 3. The power receiving apparatus 200B is configured with a resonance frequency switching circuit 209B added in parallel to the resonance frequency switching circuit 208 in the power receiving apparatus 200 as illustrated in FIG. 2. A Rx control unit 202B is provided with a function of controlling the resonance frequency switching circuit 209 in addition to the function of the Rx control unit 202. Connection of two resonance frequency switching circuits 208B and 209B to a Rx power receiving antenna 204B in parallel enables a resonance frequency of the Rx power receiving antenna 204B to be changed to have more values. A single resonance frequency switching circuit also enables a change in the same manner as a matter of course.

The power receiving apparatus 200B can select operation as the power receiving apparatus 200 and operation as the power receiving apparatus 200A. According to the selection, a power transmission apparatus 100B that wirelessly transmits power to the power receiving apparatus 200B can also select operation as the power transmission apparatus 100 and operation as the power transmission apparatus 100A. It can be also said that the power receiving apparatus 200B is configured to selectively operate similarly to the power receiving apparatus 200 when receiving power from the power transmission apparatus 100, and operate as the power receiving apparatus 200A when receiving power from the power transmission apparatus 100A.

When wireless power transmission and wireless communication of control data (apparatus status information) are conducted between the power transmission apparatus 100B and the power receiving apparatus 200B at the same carrier frequency, the wireless communication of the control data is conducted between a Tx communication unit corresponding to the Tx communication unit 112 and a Rx communication unit 224B. Between a Tx communication unit corresponding to the Tx communication unit 118 and a Rx communication unit 234B, no wireless communication of control data is conducted. Between the power transmission apparatus 100B and the power receiving apparatus 200B, wireless power transmission is executed according to the flow charts illustrated in FIG. 5A and FIG. 5B.

When wireless power transmission and wireless communication of control data are conducted between the power transmission apparatus 100B and the power receiving apparatus 200B at different carrier frequencies, the wireless communication of the control data is conducted between the Tx communication unit corresponding to the Tx communication unit 118 and the Rx communication unit 234B. Between the Tx communication unit corresponding to the Tx communication unit 112 and the Rx communication unit 224B, no wireless communication of control data is conducted. Wireless power transmission between the power transmission apparatus 100B and the power receiving apparatus 200B is executed according to the flow charts illustrated in FIG. 11A and FIG. 11B.

The resonance frequency of the Rx power receiving antenna 204B is assumed to be set in the vicinity of 20 MHz in a HF band when the resonance frequency switching circuits 208B and 209B are both non-conductive. Additionally, a resonance frequency of a Rx communication antenna 218B is assumed to be set in the vicinity of 13.56 MHz in a HF band when an antenna resonance frequency switching circuit 222B is non-conductive. The resonance frequency switching circuits 208B, 209B and 222B are all assumed to have the circuit configuration as illustrated in FIG. 3A.

FIG. 15 illustrates examples of the resonance frequencies of the Rx power receiving antenna 204B and the Rx communication antenna 218B in each state of the power receiving apparatus 200B in a case where power transmission and control data communication are conducted at the same carrier frequency. Numerical values indicated in the table illustrated in FIG. 15 as the resonance frequencies of the Rx power receiving antenna 204B and the Rx communication antenna 218B are for an explanation purposes only and aspects of the present invention are not limited to these numerical values. The power receiving apparatus 200B also has the COMM state, the WPT state, the SUSP state and the BLNK state.

In the COMM state, the resonance frequency of the Rx power receiving antenna 204B is represented as f3 and the resonance frequency of the Rx communication antenna 218B as f0. The resonance frequency of the Rx power receiving antenna 204B is set to be a frequency higher or lower than a carrier frequency of close proximity wireless communication so as not to resonate with the carrier frequency of the close proximity wireless communication. The resonance frequency of the Rx communication antenna 218B is set to be in the vicinity of the carrier frequency of the close proximity wireless communication so as to resonate with the carrier frequency of the close proximity wireless communication, thereby enabling communication. The COMM state is an initial state before a start or after an end of a power feeding sequence for executing wireless power transmission between the power transmission apparatus 100B and the power receiving apparatus 200B. The switches 304 of the resonance frequency switching circuits 208B, 209B and 222B are all off.

In the WPT state, the resonance frequency of the Rx power receiving antenna 204B is represented as f0 and the resonance frequency of the Rx communication antenna 218B as f1. The resonance frequency of the Rx power receiving antenna 204B is set to be a frequency in the vicinity of the carrier frequency of the wireless power transmission so as to resonate with the carrier frequency of the wireless power transmission, thereby receiving power. The resonance frequency of the Rx communication antenna 218B is set to be a frequency lower than the carrier frequency of the wireless power transmission so as not to resonate with the carrier frequency of the wireless power transmission and so as not to tune with a harmonic of the carrier frequency of the wireless power transmission. The switch 304 of the resonance frequency switching circuit 208B is on, the switch 304 of the resonance frequency switching circuit 209B is off, and the switch 304 of the resonance frequency switching circuit 222B is on.

In the SUSP state, the resonance frequency of the Rx power receiving antenna 204B is represented as f3 and the resonance frequency of the Rx communication antenna 218B as f1. The resonance frequencies of the Rx power receiving antenna 204B and the Rx communication antenna 218B are set to be a frequency higher or lower than any of the carrier frequency of the close proximity wireless communication and the carrier frequency of the wireless power transmission so as not to resonate with any of these carrier frequencies. The apparatus 200B enters the SUSP state before the start of the power feeding sequence for executing wireless power transmission between the power transmission apparatus 100B and the power receiving apparatus 200B. Additionally, the apparatus 200B enters the SUSP state also when after the start of the power feeding sequence, the power feeding sequence is temporarily stopped for detecting a contactless IC card as other device. In the SUSP state, the switches 304 of the resonance frequency switching circuits 208B and 209B are off and the switch 304 of the resonance frequency switching circuit 222B is on.

In the BLNK state, the resonance frequency of the Rx power receiving antenna 204B and the resonance frequency of the Rx communication antenna 218B have the same value as that in the indefinite state during switching or in the COMM state.

FIG. 16 illustrates examples of the resonance frequencies of the Rx power receiving antenna 204B and the Rx communication antenna 218B in each state of the power receiving apparatus 200B in a case where power transmission and control data communication are conducted at carrier frequencies different from each other. Numerical values indicated in the table illustrated in FIG. 16 as the resonance frequencies of the Rx power receiving antenna 204B and the Rx communication antenna 218B are for explanation purposes only and aspects of the present invention are not limited to these numerical values. The power receiving apparatus 200B has the COMM state, the WPT state, the SUSP state and the BLNK state.

In the COMM state, the resonance frequency of the Rx power receiving antenna 204B is represented as f3 and the resonance frequency of the Rx communication antenna 218B as f0. The resonance frequency of the Rx power receiving antenna 204B is set to be a frequency higher or lower than the carrier frequency of the close proximity wireless communication so as not to resonate with the carrier frequency of the short-distance close proximity wireless communication. The resonance frequency of the Rx communication antenna 218B is set to be in the vicinity of the carrier frequency of the close proximity wireless communication so as to resonate with the carrier frequency of the close proximity wireless communication, thereby enabling communication. The COMM state is an initial state before a start or after an end of the power feeding sequence for executing wireless power transmission between the power transmission apparatus 100B and the power receiving apparatus 200B. The switches 304 of the resonance frequency switching circuits 208B, 209B and 222B are all off.

In the WPT state, the resonance frequency of the Rx power receiving antenna 204B is represented as f2 and the resonance frequency of the Rx communication antenna 218B as f1. The resonance frequency of the Rx power receiving antenna 204B is set to be in the vicinity of the carrier frequency of the wireless power transmission so as to resonate with the carrier frequency of the wireless power transmission, thereby receiving power. The resonance frequency of the Rx communication antenna 218B is set to be a frequency lower than the carrier frequency of the wireless power transmission so as not to resonate with the carrier frequency of the wireless power transmission and so as not to tune with a harmonic of the carrier frequency of the wireless power transmission. The switches 304 of the resonance frequency switching circuits 208B, 209B and 222B are all on.

In the SUSP state, the resonance frequency of the Rx power receiving antenna 204B is represented as f3 and the resonance frequency of the Rx communication antenna 218B as f1. The resonance frequencies of the Rx power receiving antenna 204B and the Rx communication antenna 218B are set to be a frequency higher or lower than any of the carrier frequency of the close proximity wireless communication and the carrier frequency of the wireless power transmission so as not to resonate with any of these carrier frequencies. The switches 304 of the resonance frequency switching circuits 208B and 209B are off and the switch 304 of the resonance frequency switching circuit 222B is on. The apparatus 200B enters the SUSP state before the start of the power feeding sequence for executing wireless power transmission between the power transmission apparatus 100B and the power receiving apparatus 200B. Additionally, the apparatus 200B also enters the SUSP state when after the start of the power feeding sequence, the power feeding sequence is temporarily stopped for detecting a contactless IC card as other device.

In the BLNK state, the resonance frequency of the Rx communication antenna 218B and the resonance frequency of the Rx communication antenna 218 have the same value as that in the indefinite state during switching or in the COMM state.

As described in the foregoing, when the wireless power transmission and the wireless communication of the power transmission control are conducted at the same carrier frequency, the power transmission apparatus 100B and the power receiving apparatus 200B operate according to the flow charts illustrated in FIG. 5A and FIG. 5B. When the wireless power transmission and the wireless communication of the power transmission control are conducted at carrier frequencies different from each other, the power transmission apparatus 100B and the power receiving apparatus 200B operate according to the flow charts illustrated in FIG. 11A and FIG. 11B. The power receiving apparatus 200B can determine or the power transmission apparatus 100B can determine which flow chart is used for the apparatuses to operate. As a matter of course, when the power transmission apparatus 100B is allowed to cope with only one of the cases, the power receiving apparatus 200B operates following a procedure with which the power transmission apparatus 100B can cope.

FIG. 17 illustrates an example of a sequence when wireless power transmission is conducted according to the flow charts illustrated in FIG. 5A and FIG. 5B. FIG. 17(A) illustrates a transition of the resonance frequency of the Rx power receiving antenna 204B. FIG. 17(B) illustrates a transition of the resonance frequency of the Rx communication antenna 218B. FIG. 17(C) illustrates a change in an amount of HF band transmission power output from the power transmission apparatus 100B. FIG. 17(D) illustrates timing of control data communication of the power transmission apparatus 100B. FIG. 17 also corresponds to the table illustrated in FIG. 15.

FIG. 18 illustrates an example of a sequence when wireless power transmission is conducted according to the flow charts illustrated in FIG. 11A and FIG. 11B. FIG. 18(A) illustrates a transition of the resonance frequency of the Rx power receiving antenna 204B. FIG. 18(B) illustrates a transition of the resonance frequency of the Rx communication antenna 218B. FIG. 18(C) illustrates a change in an amount of HF band transmission power output from the power transmission apparatus 100B. FIG. 18(D) illustrates timing of control data communication of the power transmission apparatus 100B. FIG. 18 also corresponds to the table illustrated in FIG. 16.

The power receiving apparatus 200B can cope with either a case where the wireless power transmission or the wireless communication for the power transmission control are conducted in the same frequency band and a case where the same are connected at different frequencies. Specifically, the power receiving apparatus can receive power transmission even when a power transmission apparatus to be paired can cope with only either one of the cases.

Example 4

As a modification of the Example 3, a description will now be made of another combination example of resonance frequencies of the Rx power receiving antenna 204B and the Rx communication antenna 218B. Specifically, the combination illustrated in FIG. 15 is changed to that illustrated in FIG. 19 and the combination illustrated in FIG. 16 is changed to that illustrated in FIG. 20.

Here, the resonance frequency of the Rx power receiving antenna 204B is assumed to be set in the vicinity of 13.56 MHz in a HF band when the resonance frequency switching circuits 208B and 209B are both non-conductive. Additionally, the resonance frequency of the Rx communication antenna 218B is assumed to be set in the vicinity of 13.56 MHz in a HF band when the antenna resonance frequency switching circuit 222B is non-conductive. All of the resonance frequency switching circuits 208B, 209B and 222B are assumed to have the circuit configuration as illustrated in FIG. 3A.

FIG. 19 illustrates examples of the resonance frequencies of the Rx power receiving antenna 204B and the Rx communication antenna 218B in each state of the power receiving apparatus 200B in a case where power transmission and control data communication are conducted at the same carrier frequency. Numerical values indicated in the table illustrated in FIG. 19 as the resonance frequencies of the Rx power receiving antenna 204B and the Rx communication antenna 218B are for explanation purposes only and aspects of the present invention are not limited to these numerical values. The power receiving apparatus 200B has the COMM state, the WPT state, the SUSP state and the BLNK state. Similarly to the Example 3, wireless power transmission between the power transmission apparatus 100B and the power receiving apparatus 200B is executed according to the flow charts illustrated in FIG. 5A and FIG. 5B.

In the COMM state, the resonance frequency of the Rx power receiving antenna 204B is represented as f2 and the resonance frequency of the Rx communication antenna 218B as f0. The resonance frequency of the Rx power receiving antenna 204B is set to be a frequency higher or lower than the carrier frequency of the close proximity wireless communication so as not to resonate with the carrier frequency of the close proximity wireless communication. The resonance frequency of the Rx communication antenna 218B is set to be in the vicinity of the carrier frequency of the close proximity wireless communication so as to resonate with the carrier frequency of the close proximity wireless communication, thereby enabling communication. The COMM state is an initial state before a start or after an end of a power feeding sequence for executing the wireless power transmission between the power transmission apparatus 100B and the power receiving apparatus 200B. The switch 304 of the resonance frequency switching circuit 208B is on, the switch 304 of the resonance frequency switching circuit 209B is off and the switch 304 of the resonance frequency switching circuit 222B is off.

In the WPT state, the resonance frequency of the Rx power receiving antenna 204B is represented as f0 and the resonance frequency of the Rx communication antenna 218B as f1. The resonance frequency of the Rx power receiving antenna 204B is set to be a frequency in the vicinity of the carrier frequency of the wireless power transmission so as to resonate with the carrier frequency of the wireless power transmission, thereby receiving power. The resonance frequency of the Rx communication antenna 218B is set to be a frequency lower than the carrier frequency of the wireless power transmission so as not to resonate with the carrier frequency of the wireless power transmission and so as not to tune with a harmonic of the carrier frequency of the wireless power transmission. The switches 304 of the resonance frequency switching circuits 208B and 209B are off, and the switch 304 of the resonance frequency switching circuit 222B is on.

In the SUSP state, the resonance frequency of the Rx power receiving antenna 204B is represented as f2 and the resonance frequency of the Rx communication antenna 218B as f1. The resonance frequencies of the Rx power receiving antenna 204B and the Rx communication antenna 218B are set to be a frequency higher or lower than any of the carrier frequency of the close proximity wireless communication and the carrier frequency of the wireless power transmission so as not to resonate with any of these carrier frequencies. The switch 304 of the resonance frequency switching circuit 208B is on, the switch 304 of the resonance frequency switching circuit 209B is off, and the switch 304 of the resonance frequency switching circuit 222B is on.

In the BLNK state, the resonance frequency of the Rx power receiving antenna 204B and the resonance frequency of the Rx communication antenna 218B have the same value as that in the indefinite state during switching or in the COMM state.

FIG. 20 illustrates examples of the resonance frequencies of the Rx power receiving antenna 204B and the Rx communication antenna 218B in each state of the power receiving apparatus 200B in a case where power transmission and control data communication are conducted at carrier frequencies different from each other. Numerical values indicated in the table illustrated in FIG. 20 as the resonance frequencies of the Rx power receiving antenna 204B and the Rx communication antenna 218B are for explanation purposes only and aspects of the present invention are not limited to these numerical values. The power receiving apparatus 200B has the COMM state, the WPT state, the SUSP state and the BLNK state. Similarly to the Example 3, wireless power transmission between the power transmission apparatus 100B and the power receiving apparatus 200B is executed according to the flow charts illustrated in FIG. 11A and FIG. 11B.

In the COMM state, the resonance frequency of the Rx power receiving antenna 204B is represented as f2 and the resonance frequency of the Rx communication antenna 218B as f0. The resonance frequency of the Rx power receiving antenna 204B is set to be a frequency higher or lower than the carrier frequency of the close proximity wireless communication so as not to resonate with the carrier frequency of the short-distance close proximity wireless communication. The resonance frequency of the Rx communication antenna 218B is set to be in the vicinity of the carrier frequency of the close proximity wireless communication so as to resonate with the carrier frequency of the close proximity wireless communication, thereby enabling communication. The COMM state is an initial state before a start or after an end of the power feeding sequence for executing wireless power transmission between the power transmission apparatus 100B and the power receiving apparatus 200B. The switch 304 of the resonance frequency switching circuit 208B is on, the switch 304 of the resonance frequency switching circuit 209B is off, and the switch 304 of the resonance frequency switching circuit 222B is off.

In the WPT state, the resonance frequency of the Rx power receiving antenna 204B is represented as f2 and the resonance frequency of the Rx communication antenna 218B as f1. The resonance frequency of the Rx power receiving antenna 204B is set to be in the vicinity of the carrier frequency of the wireless power transmission so as to resonate with the carrier frequency of the wireless power transmission, thereby receiving power. The resonance frequency of the Rx communication antenna 218B is set to be a frequency lower than the carrier frequency of the wireless power transmission so as not to resonate with the carrier frequency of the wireless power transmission and so as not to tune with a harmonic of the carrier frequency of the wireless power transmission. The switch 304 of the resonance frequency switching circuit 208B is on, the switch 304 of the resonance frequency switching circuit 209B is off, and the switch 304 of the resonance frequency switching circuit 222B is on.

In the SUSP state, the resonance frequency of the Rx power receiving antenna 204B is represented as f1 and the resonance frequency of the Rx communication antenna 218B as f1. The resonance frequencies of the Rx power receiving antenna 204B and the Rx communication antenna 218B are set to be a frequency higher or lower than any of the carrier frequency of the close proximity wireless communication and the carrier frequency of the wireless power transmission so as not to resonate with any of these carrier frequencies. In the SUSP state, the switches 304 of the resonance frequency switching circuits 208B, 209B and 222B are all on.

In the BLNK state, the resonance frequency of the Rx communication antenna 218B and the resonance frequency of the Rx communication antenna 218 have the same value as that in the indefinite state during switching or in the COMM state.

Similar to the manner as described in the Example 3, when the wireless power transmission and the wireless communication of the power transmission control are conducted at the same carrier frequency, the power transmission apparatus 100B and the power receiving apparatus 200B operate according to the flow charts illustrated in FIG. 5A and FIG. 5B. FIG. 21 is the timing chart of an example of a power transmission control sequence executed in this case. By contrast, when the wireless power transmission and the wireless communication of the power transmission control are conducted at the carrier frequencies different from each other, the power transmission apparatus 100B and the power receiving apparatus 200B operate according to the flow charts illustrated in FIG. 11A and FIG. 11B. FIG. 22 is the timing chart of an example of a power transmission control sequence in this case.

Whether the wireless power transmission and the wireless communication of the power transmission control are conducted at the same carrier frequency or at carrier frequencies different from each other can be determined by the power receiving apparatus 200B or by the power transmission apparatus 100B. As a matter of course, when the power transmission apparatus 100B can cope only with one of the cases, the power receiving apparatus 200B operates following a procedure with which the power transmission apparatus 100B can cope.

Example 5

While in the above Examples 1 to 4, the description has been made of the wireless communication of the power transmission control conducted using JISX6319-4 as a close proximity wireless communication standard, other communication methods can be used. Wireless communication using the protocol of, for example, ISO/IEC21481, ISO/IEC14443 or ISO/IEC15693 as other close proximity wireless communication standards is applicable. For coping with these communication standards, for example, the Tx communication unit 112 of the power transmission apparatus 100 and the Tx communication unit corresponding to the power transmission apparatus 100A, 100B can be provided with a function of a contactless IC reader/writer and the Rx communication units 224, 224A and 224B can be provided with a function of a contactless IC.

In place of Bluetooth® Low Energy, a similar short-distance wireless communication standard can be used for wireless communication of power transmission control. Among such short-distance wireless communication standards are, for example, IEEE802.11 as a WLAN standard and IEEE802.15.1 as a close proximity wireless standard, which can be also used in aspects of the present invention.

As the connection processing for wireless communication of power transmission control, the description has been made of a configuration in which the power transmission apparatus outputs a polling signal, and the power receiving apparatus having received the polling signal transmits a connection request to the transmission apparatus. Aspects of the present invention are not limited to such connection processing. Aspects of the present invention are applicable to, for example, a configuration in which the power receiving apparatus outputs a polling signal, and the power transmission apparatus having received the polling signal transmits a connection request to the power receiving apparatus.

Although as the Tx power transmission antenna of the power transmission apparatus and the Rx power receiving antenna of the power receiving apparatus, an antenna has been illustrated that has a resonance frequency in the vicinity of 13.56 MHz or 6.78 MHz in a HF band, the illustration is an example for explanation purposes only and aspects of the present invention are not limited to these resonance frequencies.

The Tx power transmission antenna 110 and the Tx communication antenna 116 of the power transmission apparatus can be physically realized as one antenna when possible in terms of packaging, which can be included in a technical range of aspects of the present invention.

Aspects of the present invention can be also be attained by supplying the apparatus with a storage medium that records program codes of software realizing the functions of the above-described Examples. In this case, a computer (or a CPU or a MPU) including a control unit of the apparatus to which the storage medium is supplied reads and executes the program codes stored in the storage medium. The program codes read from the storage medium by themselves realize the functions of the above-described Examples, so that the program codes by themselves and the storage medium which stores the program codes will configure aspects of the present invention.

Examples of a storage medium for supplying program codes include a magnetic disk, a hard disk, an optical disk, a magneto-optical disk, a CD-ROM, a CD-R, a magnetic tape, a non-volatile memory card and a ROM.

Aspects of the present invention also include a case where, based on instructions of the above-described program codes, an OS (a basic system or an operating system) running on the apparatus executes a part or all of processing and the processing realizes the functions of the above-described Examples.

Aspects of the present invention also include a case where a program code read from the storage medium is written in a memory provided in a function extended board inserted in the apparatus or provided in a function extended unit connected to a computer, thereby realizing the functions of the above-described Examples. In this case, based on the instructions of the above-described program codes, a CPU or the like provided in the function extended board or the function extended unit executes a part or all of the actual processing.

Although in the foregoing, examples of aspects of the present invention have been described, the aspects of the present invention are not limited to these examples, and can be modified and changed within the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-208425, filed Oct. 22, 2015, which is hereby incorporated by reference herein in its entirety.

What is claimed is:

1. A power receiving apparatus comprising:
a first antenna;
a second antenna; and
a control unit configured to execute control to exclusively and alternately execute power reception processing of wirelessly obtaining power from a power transmission apparatus via the first antenna and communication processing of wirelessly communicating with the power transmission apparatus via the second antenna, wherein power is wirelessly received by receiving a signal of a predetermined frequency via the first antenna in the power reception processing, and wireless communication is performed by receiving the signal of the predetermined frequency via the second antenna in the communication processing,
wherein during execution of the communication processing, the control unit executes control to set a resonance frequency of the second antenna to be the predetermined frequency and a resonance frequency of the first antenna to be a frequency other than the predetermined frequency and frequencies of an integral multiple of the predetermined frequency, so that the first antenna does not resonate with the signal of the predetermined frequency,
wherein during execution of the power reception processing, the control unit executes control to set the resonance frequency of the first antenna to be the predetermined frequency and the resonance frequency of the second antenna to be a frequency other than the predetermined frequency and frequencies of an integral multiple of the predetermined frequency, so that the second antenna does not resonate with the signal of the predetermined frequency, and
wherein in a case where execution of the communication processing is changed to execution of the power reception processing, the control unit executes control to first set the resonance frequency of the second antenna to be the predetermined frequency and then to set the resonance frequency of the first antenna to be a frequency other than the predetermined frequency and frequencies of an integral multiple of the predetermined frequency, so that the first antenna does not resonate with the signal of the predetermined frequency.

2. The power receiving apparatus according to claim 1, wherein during execution of the communication processing, after setting a resonance frequency of the second antenna to be the predetermined frequency, the control unit executes control to set a resonance frequency of the first antenna to be a frequency lower than the predetermined frequency.

3. The power receiving apparatus according to claim 1, wherein during execution of the power reception processing, the control unit executes control to set a resonance frequency of the second antenna to be a frequency lower than the predetermined frequency.

4. The power receiving apparatus according to claim 1, wherein during execution of the power reception processing, after setting a resonance frequency of the first antenna to be the predetermined frequency, the control unit executes control to set a resonance frequency of the second antenna to be a frequency lower than the predetermined frequency.

5. The power receiving apparatus according to claim 1, wherein a predetermined period is provided between the power reception processing and the communication processing, and
in the predetermined period, neither communication nor power reception is conducted.

6. The power receiving apparatus according to claim 5, wherein a time of the predetermined period is determined based on data communicated with the power transmission apparatus in the communication processing.

7. The power receiving apparatus according to claim 1, wherein a predetermined period is provided between the power reception processing and the communication processing, and
wherein in the predetermined period, the control unit executes control to set both a resonance frequency of the first antenna and a resonance frequency of the second antenna, to be a frequency lower than (i) any of a carrier frequency band of the first antenna for the execution of the power reception processing or (ii) carrier frequency band of the second antenna for the execution of the communication processing.

8. The power receiving apparatus according to claim 1, wherein, in the communication processing, information related to power received in the power reception processing is received.

9. A method of controlling a power receiving apparatus including a first antenna and a second antenna, comprising:
the control step of exclusively and alternately executing power reception processing of wirelessly obtaining power from a power transmission apparatus via the first antenna and communication processing of wirelessly communicating with the power transmission apparatus via the second antenna, wherein power is wirelessly received by receiving a signal of a predetermined frequency via the first antenna in the power reception processing, and wireless communication is performed by receiving the signal of the predetermined frequency via the second antenna in the communication processing, wherein during execution of the communication processing, a resonance frequency of the second antenna is set to be the predetermined frequency and a resonance frequency of the first antenna to be a frequency other than the predetermined frequency and frequencies of an integral multiple of the predetermined frequency, so that the first antenna does not resonate with the signal of the predetermined frequency, wherein during execution of the power reception processing, the control unit executes control to set the resonance frequency of the first antenna to be the predetermined frequency and the resonance frequency of the second antenna to be a frequency other than the predetermined frequency and frequencies of an integral multiple of the predetermined frequency, so that the second antenna does not resonate with the signal of the predetermined frequency, and wherein in a case where execution of the communication processing is changed to execution of the power reception processing, the control unit executes control first to set the resonance frequency of the second antenna to be the predetermined frequency and then to set the resonance frequency of the first antenna to be a frequency other than the predetermined frequency and frequencies of an integral multiple of the predetermined frequency, so that the first antenna does not resonate with the signal of the predetermined frequency.

10. A non-transitory recording medium storing computer executable instructions which, when executed, cause a power receiving apparatus including a first antenna and a second antenna, to execute a control method, the control method comprising:

the control step of exclusively and alternately executing power reception processing of wirelessly obtaining power from a power transmission apparatus via the first antenna and communication processing of wirelessly communicating with the power transmission apparatus via the second antenna, wherein power is wirelessly received by receiving a signal of a predetermined frequency via the first antenna in the power reception processing, and wireless communication is performed by receiving the signal of the predetermined frequency via the second antenna in the communication processing, wherein during execution of the communication processing, a resonance frequency of the second antenna is set to be the predetermined frequency and a resonance frequency of the first antenna to be a frequency other than the predetermined frequency and frequencies of an integral multiple of the predetermined frequency, so that the first antenna does not resonate with the signal of the predetermined frequency, wherein during execution of the power reception processing, the control unit executes control to set the resonance frequency of the first antenna to be the predetermined frequency and the resonance frequency of the second antenna to be a frequency other than the predetermined frequency and frequencies of an integral multiple of the predetermined frequency, so that the second antenna does not resonate with the signal of the predetermined frequency, and wherein in a case where execution of the communication processing is changed to execution of the power reception processing, the control unit executes control first to set the resonance frequency of the second antenna to be the predetermined frequency and then to set the resonance frequency of the first antenna to be a frequency other than the predetermined frequency and frequencies of an integral multiple of the predetermined frequency, so that the first antenna does not resonate with the signal of the predetermined frequency.

* * * * *